(12) United States Patent
Smits

(10) Patent No.: US 10,451,737 B2
(45) Date of Patent: *Oct. 22, 2019

(54) FAST SCANNING WITH DYNAMIC VOXEL PROBING

(71) Applicant: Gerard Dirk Smits, Los Gatos, CA (US)

(72) Inventor: Gerard Dirk Smits, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/114,139

(22) Filed: Aug. 27, 2018

(65) Prior Publication Data
US 2018/0364355 A1  Dec. 20, 2018

Related U.S. Application Data

(63) Continuation of application No. 15/799,149, filed on Oct. 31, 2017, now Pat. No. 10,067,230.
(Continued)

(51) Int. Cl.
*G01S 17/00* (2006.01)
*G01S 17/10* (2006.01)
(Continued)

(52) U.S. Cl.
CPC .......... *G01S 17/10* (2013.01); *G01S 7/4808* (2013.01); *G01S 7/4817* (2013.01);
(Continued)

(58) Field of Classification Search
USPC ........................................ 356/5.01
See application file for complete search history.

(56) References Cited

U.S. PATENT DOCUMENTS

| 4,019,262 A | 4/1977 | Breglia et al. |
| 4,340,274 A | 7/1982 | Spooner |

(Continued)

FOREIGN PATENT DOCUMENTS

| DE | 102015205826 A1 | 10/2015 |
| EP | 0722109 A1 | 7/1996 |

(Continued)

OTHER PUBLICATIONS

Office Communication for U.S. Appl. No. 15/444,182 dated Sep. 13, 2018, pp. 1-11.
(Continued)

*Primary Examiner* — James R Hulka
(74) *Attorney, Agent, or Firm* — John W. Branch; Lowe Graham Jones PLLC

(57) ABSTRACT

A LIDAR system includes a scanner; a receiver; and one or more processor devices to perform actions, including: scanning a continuous light beam over the field of view in a first scan pass; detecting photons of the continuous light beam that are reflected from one or more objects; determining a coarse range to the one or more objects based on times of departure of the photons of the continuous light beam and times of arrival of the photons at the receiver; scanning light pulses over the field of view in a second scan pass; detecting photons from the light pulses that are reflected from the one or more objects; and determining a refined range to the one or more objects based on times of departure of the photons of the light pulses and times of arrival of the photons at the receiver.

27 Claims, 11 Drawing Sheets

Related U.S. Application Data

(60) Provisional application No. 62/496,888, filed on Oct. 31, 2016.

(51) Int. Cl.
  *G01S 7/481* (2006.01)
  *G01S 17/02* (2006.01)
  *G01S 17/32* (2006.01)
  *G01S 17/42* (2006.01)
  *G01S 7/48* (2006.01)
  G01S 17/89 (2006.01)

(52) U.S. Cl.
  CPC ............ *G01S 17/023* (2013.01); *G01S 17/32* (2013.01); *G01S 17/42* (2013.01); G01S 17/89 (2013.01)

(56) References Cited

U.S. PATENT DOCUMENTS

| | | | |
|---|---|---|---|
| 4,820,041 A | 4/1989 | Davidson et al. | |
| 4,988,187 A | 1/1991 | Kuriyama | |
| 5,052,820 A | 10/1991 | McGinniss et al. | |
| 5,107,122 A | 4/1992 | Barkan et al. | |
| 5,115,230 A | 5/1992 | Smoot | |
| 5,218,427 A | 6/1993 | Koch | |
| 5,245,398 A | 9/1993 | Ludden | |
| 5,455,588 A | 10/1995 | Lew et al. | |
| 5,506,682 A | 4/1996 | Pryor | |
| 5,521,722 A | 5/1996 | Colvill et al. | |
| 5,559,322 A | 9/1996 | Jacoby et al. | |
| 5,572,251 A | 11/1996 | Ogawa | |
| 5,580,140 A | 12/1996 | Katz et al. | |
| 5,661,506 A | 8/1997 | Lazzouni et al. | |
| 5,812,664 A | 9/1998 | Bernobich et al. | |
| 5,914,783 A | 6/1999 | Barrus | |
| 5,930,378 A | 7/1999 | Kubota et al. | |
| 6,115,022 A | 9/2000 | Mayer, III et al. | |
| 6,130,706 A | 10/2000 | Hart, Jr. et al. | |
| 6,195,446 B1 | 2/2001 | Skoog | |
| 6,307,526 B1 | 10/2001 | Mann | |
| 6,404,416 B1 | 6/2002 | Kahn et al. | |
| 6,535,182 B2 * | 3/2003 | Stanton | G02B 27/017 345/7 |
| 6,535,275 B2 * | 3/2003 | McCaffrey | G01S 17/105 356/141.1 |
| 6,543,899 B2 * | 4/2003 | Covannon | G02B 5/12 345/7 |
| 6,545,670 B1 | 4/2003 | Pryor | |
| 6,670,603 B2 | 12/2003 | Shimada et al. | |
| 6,692,994 B2 * | 2/2004 | Davis | H01L 23/5256 257/50 |
| 6,704,000 B2 | 3/2004 | Carpenter | |
| 6,710,767 B1 | 3/2004 | Hasegawa et al. | |
| 6,766,066 B2 | 7/2004 | Kitazawa | |
| 6,843,564 B2 * | 1/2005 | Putilin | H04N 13/398 353/7 |
| 6,843,568 B2 * | 1/2005 | Schenk | G02B 26/105 348/E5.139 |
| 6,894,823 B2 * | 5/2005 | Taylor | G02B 26/085 359/200.7 |
| 6,982,683 B2 | 1/2006 | Stanton | |
| 7,006,142 B2 * | 2/2006 | Seo | G01S 7/483 257/E27.157 |
| 7,023,536 B2 * | 4/2006 | Zhang | G01B 11/002 356/138 |
| 7,027,222 B2 * | 4/2006 | Takahashi | G02B 27/225 248/291.1 |
| 7,116,455 B2 * | 10/2006 | Yamaoka | G03H 1/00 359/204.4 |
| 7,119,965 B1 | 10/2006 | Rolland et al. | |
| 7,144,117 B2 | 12/2006 | Kojima | |
| 7,182,465 B2 | 2/2007 | Fuchs et al. | |
| 7,203,383 B2 * | 4/2007 | Fisher | G06F 3/03545 382/188 |
| 7,232,229 B2 | 6/2007 | Peeters et al. | |
| 7,262,765 B2 | 8/2007 | Brown et al. | |
| 7,278,745 B2 * | 10/2007 | Engle | G03B 21/142 353/122 |
| 7,280,211 B2 * | 10/2007 | Horibe | G01S 7/4972 356/399 |
| 7,283,301 B2 * | 10/2007 | Peeters | G09G 3/02 359/443 |
| 7,289,110 B2 | 10/2007 | Hansson | |
| 7,303,289 B2 | 12/2007 | Fujiwara | |
| 7,348,528 B2 * | 3/2008 | Marshall | G01S 7/4812 250/201.3 |
| 7,349,553 B2 * | 3/2008 | Rodriguez | H04N 1/32144 380/277 |
| 7,359,041 B2 * | 4/2008 | Xie | G01S 17/48 356/139.04 |
| 7,375,804 B2 * | 5/2008 | Liebman | G01S 7/4818 356/5.01 |
| 7,377,656 B2 * | 5/2008 | Nojima | G03B 21/10 348/E5.139 |
| 7,440,691 B2 * | 10/2008 | Beniyama | G03D 9/02 396/325 |
| 7,511,847 B2 | 3/2009 | Siiverbrook et al. | |
| 7,554,652 B1 | 7/2009 | Babin et al. | |
| 7,667,598 B2 * | 2/2010 | Yenisch | G01S 7/4815 250/206.1 |
| 7,787,134 B2 | 8/2010 | Kohnen et al. | |
| 7,905,567 B2 * | 3/2011 | Orsley | H04N 1/0473 347/19 |
| 7,911,444 B2 | 3/2011 | Yee | |
| 8,115,728 B2 | 2/2012 | Feng | |
| 8,169,447 B2 * | 5/2012 | Bhogal | G09G 5/028 345/589 |
| 8,170,329 B2 | 5/2012 | Seko et al. | |
| 8,189,176 B2 * | 5/2012 | Moir | G01P 3/36 356/28 |
| 8,259,239 B2 * | 9/2012 | Hua | G02B 13/00 349/11 |
| 8,282,222 B2 | 10/2012 | Smits | |
| 8,297,758 B2 | 10/2012 | Choi et al. | |
| 8,330,942 B2 * | 12/2012 | Nordenfelt | G01C 15/002 356/3.01 |
| 8,355,117 B2 * | 1/2013 | Niclass | G01C 3/08 356/3.01 |
| 8,430,512 B2 | 4/2013 | Smits | |
| 8,493,573 B2 | 7/2013 | Chinn et al. | |
| 8,558,810 B2 * | 10/2013 | Guo | G06F 3/0386 345/156 |
| 8,573,783 B2 | 11/2013 | Smits | |
| 8,665,435 B2 * | 3/2014 | Hidaka | G01B 11/14 356/328 |
| 8,696,141 B2 | 4/2014 | Smits | |
| 8,711,370 B1 | 4/2014 | Smits | |
| 8,718,326 B2 * | 5/2014 | Yoon | G06T 7/593 382/103 |
| 8,723,928 B2 * | 5/2014 | Moriyama | H04N 13/398 348/51 |
| 8,773,512 B1 | 7/2014 | Rafii | |
| 8,780,161 B2 * | 7/2014 | Samadani | H04N 7/142 250/208.1 |
| 8,797,531 B2 * | 8/2014 | Knox | G01N 21/53 356/337 |
| 8,941,817 B2 | 1/2015 | Laudrain | |
| 8,947,755 B2 * | 2/2015 | Konuma | G02B 27/0018 359/212.2 |
| 8,953,242 B2 * | 2/2015 | Larson | G02B 27/2264 359/464 |
| 8,957,847 B1 | 2/2015 | Karakotsios et al. | |
| 8,994,780 B2 | 3/2015 | Moore | |
| 9,026,596 B2 * | 5/2015 | Perez | H04N 9/8205 345/207 |
| 9,080,866 B1 | 7/2015 | Dowdall et al. | |
| 9,131,192 B2 * | 9/2015 | Ubillos | G06F 3/04855 |
| 9,134,799 B2 * | 9/2015 | Mark | G06F 1/1639 |
| 9,151,607 B2 | 10/2015 | Davies et al. | |

(56) References Cited

U.S. PATENT DOCUMENTS

| | | | |
|---|---|---|---|
| 9,244,339 B2* | 1/2016 | Wang | G03B 21/60 |
| 9,323,055 B2* | 4/2016 | Baillot | G02B 27/017 |
| 9,366,519 B2* | 6/2016 | Danbury | G01B 5/205 |
| 9,377,533 B2* | 6/2016 | Smits | G01S 17/66 |
| 9,392,225 B2 | 7/2016 | Eisenberg | |
| 9,454,014 B2* | 9/2016 | Kurashige | G02B 5/0252 |
| 9,482,514 B2* | 11/2016 | Bridges | G01S 17/003 |
| 9,562,764 B2* | 2/2017 | France | G01C 15/00 |
| 9,599,713 B2* | 3/2017 | Giger | G01S 17/10 |
| 9,618,610 B2* | 4/2017 | Kao | G01S 17/89 |
| 9,813,673 B2 | 11/2017 | Smits | |
| 9,854,196 B2* | 12/2017 | Liu | G02B 27/017 |
| 9,864,440 B2* | 1/2018 | Geller | G06F 3/03545 |
| 9,939,233 B2* | 4/2018 | Scott | F41H 3/00 |
| 9,946,076 B2* | 4/2018 | Smits | G03B 35/18 |
| 9,952,033 B2* | 4/2018 | Martini | G01B 11/043 |
| 9,961,337 B2* | 5/2018 | Stroetmann | H04N 13/122 |
| 10,037,017 B2* | 7/2018 | Wooldridge | G01B 21/045 |
| 10,067,230 B2* | 9/2018 | Smits | G01S 17/023 |
| 2001/0043165 A1 | 11/2001 | Stanton | |
| 2002/0011987 A1* | 1/2002 | Kitazawa | G06F 3/0386 345/156 |
| 2002/0036765 A1 | 3/2002 | McCaffrey et al. | |
| 2002/0039138 A1 | 4/2002 | Edelson et al. | |
| 2002/0040971 A1 | 4/2002 | Ono | |
| 2002/0067466 A1 | 6/2002 | Covannon et al. | |
| 2002/0089489 A1* | 7/2002 | Carpenter | G06F 3/0386 345/158 |
| 2002/0100884 A1 | 8/2002 | Maddock | |
| 2002/0145588 A1 | 10/2002 | McCahon et al. | |
| 2002/0149694 A1 | 10/2002 | Seo | |
| 2003/0010888 A1 | 1/2003 | Shirnada et al. | |
| 2003/0045034 A1 | 3/2003 | Davis et al. | |
| 2003/0156260 A1 | 8/2003 | Putilin et al. | |
| 2003/0202234 A1 | 10/2003 | Taylor et al. | |
| 2003/0202679 A1 | 10/2003 | Rodriguez | |
| 2003/0214710 A1 | 11/2003 | Takahashi et al. | |
| 2003/0222649 A1 | 12/2003 | Starkweather | |
| 2004/0006424 A1 | 1/2004 | Joyce et al. | |
| 2004/0041996 A1 | 3/2004 | Abe | |
| 2004/0054359 A1 | 3/2004 | Ruiz et al. | |
| 2004/0100508 A1* | 5/2004 | Hansson | G06K 9/2081 715/863 |
| 2004/0114834 A1 | 6/2004 | Fisher | |
| 2004/0218155 A1 | 11/2004 | Schenk et al. | |
| 2004/0240754 A1 | 12/2004 | Smith et al. | |
| 2004/0263874 A1* | 12/2004 | Silverbrook | B41J 2/16511 358/1.6 |
| 2005/0030305 A1* | 2/2005 | Brown | G02B 26/0841 345/207 |
| 2005/0035943 A1 | 2/2005 | Kojirna | |
| 2005/0052635 A1 | 3/2005 | Xle et al. | |
| 2005/0083248 A1 | 4/2005 | Biocca et al. | |
| 2005/0099664 A1 | 5/2005 | Yamaoka | |
| 2005/0159893 A1 | 7/2005 | Isaji et al. | |
| 2005/0195375 A1* | 9/2005 | Fujiwara | G02B 26/101 353/101 |
| 2005/0195387 A1 | 9/2005 | Zhang et al. | |
| 2005/0219530 A1 | 10/2005 | Horibe et al. | |
| 2005/0254726 A1* | 11/2005 | Fuchs | H04N 5/74 382/285 |
| 2005/0273830 A1 | 12/2005 | Silver et al. | |
| 2006/0028374 A1 | 2/2006 | Fullerton | |
| 2006/0028622 A1 | 2/2006 | Nojima et al. | |
| 2006/0132447 A1 | 6/2006 | Conrad | |
| 2006/0132472 A1 | 6/2006 | Peeters et al. | |
| 2006/0132729 A1 | 6/2006 | Engle | |
| 2006/0197936 A1 | 9/2006 | Liebman | |
| 2006/0256133 A1 | 11/2006 | Rosenberg | |
| 2007/0046625 A1 | 3/2007 | Yee | |
| 2007/0053679 A1 | 3/2007 | Beniyama et al. | |
| 2007/0064242 A1 | 3/2007 | Childers | |
| 2007/0103699 A1* | 5/2007 | Kohnen | G01B 11/14 356/620 |
| 2007/0138371 A1 | 6/2007 | Marshall | |
| 2007/0182949 A1 | 8/2007 | Niclass | |
| 2007/0273610 A1 | 11/2007 | Baillot | |
| 2008/0018591 A1 | 1/2008 | Pittel et al. | |
| 2008/0266169 A1 | 10/2008 | Akita | |
| 2008/0291213 A1 | 11/2008 | Bhogal | |
| 2008/0316026 A1* | 12/2008 | Yenisch | G01S 7/4815 340/555 |
| 2008/0317077 A1 | 12/2008 | Hoving et al. | |
| 2009/0096994 A1 | 4/2009 | Smits | |
| 2009/0147239 A1 | 6/2009 | Zhu et al. | |
| 2009/0285590 A1 | 11/2009 | Orsley | |
| 2010/0002154 A1 | 1/2010 | Hua | |
| 2010/0008588 A1 | 1/2010 | Feldkhun et al. | |
| 2010/0014750 A1* | 1/2010 | Seko | G06K 9/3216 382/154 |
| 2010/0045967 A1 | 2/2010 | Moir | |
| 2010/0110385 A1* | 5/2010 | Choi | G06F 1/1626 353/20 |
| 2010/0142856 A1 | 6/2010 | Takeuchi et al. | |
| 2010/0149518 A1 | 6/2010 | Nordenfelt et al. | |
| 2010/0328054 A1 | 12/2010 | Yim et al. | |
| 2011/0001793 A1 | 1/2011 | Moriyama et al. | |
| 2011/0123113 A1 | 5/2011 | Berretty et al. | |
| 2011/0211243 A1 | 9/2011 | Smits | |
| 2011/0249157 A1 | 10/2011 | Fredembach et al. | |
| 2011/0304842 A1 | 12/2011 | Kao et al. | |
| 2012/0017147 A1 | 1/2012 | Mark | |
| 2012/0050528 A1* | 3/2012 | Davies | G01C 11/02 348/136 |
| 2012/0132713 A1 | 5/2012 | Chaum | |
| 2012/0134537 A1 | 5/2012 | Yoon et al. | |
| 2012/0140231 A1 | 6/2012 | Knox et al. | |
| 2012/0187296 A1 | 7/2012 | Hollander et al. | |
| 2012/0224019 A1 | 9/2012 | Samadani et al. | |
| 2012/0229818 A1* | 9/2012 | Chinn | G01S 3/781 356/622 |
| 2012/0250152 A1 | 10/2012 | Larson et al. | |
| 2012/0274937 A1 | 11/2012 | Hays et al. | |
| 2012/0320013 A1 | 12/2012 | Perez et al. | |
| 2013/0003081 A1 | 1/2013 | Smits | |
| 2013/0021271 A1 | 1/2013 | Guo | |
| 2013/0079983 A1 | 3/2013 | Ehilgen et al. | |
| 2013/0088465 A1 | 4/2013 | Geller et al. | |
| 2013/0170006 A1 | 7/2013 | Kurashige et al. | |
| 2013/0176561 A1 | 7/2013 | Hidaka | |
| 2013/0215487 A1 | 9/2013 | Konuma et al. | |
| 2013/0229669 A1 | 9/2013 | Smits | |
| 2013/0239057 A1 | 9/2013 | Ubillos et al. | |
| 2013/0293396 A1 | 11/2013 | Selevan | |
| 2013/0300637 A1 | 11/2013 | Smits et al. | |
| 2013/0300670 A1 | 11/2013 | Besperstov et al. | |
| 2013/0342813 A1 | 12/2013 | Wang | |
| 2014/0022539 A1 | 1/2014 | France | |
| 2014/0098179 A1 | 4/2014 | Moore | |
| 2014/0146243 A1 | 5/2014 | Liu et al. | |
| 2014/0176954 A1 | 6/2014 | Scott et al. | |
| 2014/0215841 A1 | 8/2014 | Danbury et al. | |
| 2014/0267620 A1 | 9/2014 | Bridges | |
| 2014/0273752 A1 | 9/2014 | Bajaj et al. | |
| 2014/0285818 A1 | 9/2014 | Holz | |
| 2014/0307248 A1* | 10/2014 | Giger | G01S 17/10 356/5.01 |
| 2014/0350836 A1 | 11/2014 | Stettner et al. | |
| 2015/0009493 A1 | 1/2015 | Kwiatkowski | |
| 2015/0066196 A1 | 3/2015 | Wooldridge et al. | |
| 2015/0091815 A1 | 4/2015 | Michaelis | |
| 2015/0225783 A1 | 8/2015 | Mears et al. | |
| 2015/0233703 A1 | 8/2015 | Martini et al. | |
| 2015/0279114 A1 | 10/2015 | Yonekubo | |
| 2015/0285625 A1 | 10/2015 | Deane | |
| 2015/0286293 A1 | 10/2015 | Gruhlke et al. | |
| 2016/0011312 A1 | 1/2016 | Leyva | |
| 2016/0014403 A1 | 1/2016 | Stroetmann | |
| 2016/0041266 A1 | 2/2016 | Smits | |
| 2016/0050345 A1 | 2/2016 | Longbotham et al. | |
| 2016/0162747 A1 | 6/2016 | Singh et al. | |
| 2016/0259038 A1 | 9/2016 | Retterath et al. | |
| 2016/0306044 A1 | 10/2016 | Smits | |

(56) References Cited

U.S. PATENT DOCUMENTS

| | | | |
|---|---|---|---|
| 2016/0335778 A1 | 11/2016 | Smits | |
| 2017/0010104 A1 | 1/2017 | Aviel | |
| 2017/0108443 A1 | 4/2017 | Kurihara et al. | |
| 2017/0131090 A1 | 5/2017 | Bronstein et al. | |
| 2017/0208292 A1* | 7/2017 | Smits .................. | H04N 13/243 |
| 2018/0039852 A1 | 2/2018 | Nakamura et al. | |
| 2019/0080612 A1 | 3/2019 | Weissman et al. | |

FOREIGN PATENT DOCUMENTS

| | | | |
|---|---|---|---|
| JP | 11119184 A | 4/1999 | |
| JP | 2001045381 A | 2/2001 | |
| JP | 2003029201 A | 1/2003 | |
| JP | 2004132914 A | 4/2004 | |
| JP | 2005519338 A | 6/2005 | |
| JP | 2011197674 A | 10/2011 | |
| JP | 2013097138 A | 5/2013 | |
| KR | 10-2011-0115752 A | 10/2011 | |
| KR | 101665938 B1 | 10/2016 | |
| WO | 1992/89718 A1 | 10/1992 | |
| WO | 2000/034818 A1 | 6/2000 | |
| WO | 2006/063577 A1 | 6/2006 | |
| WO | 2009/049272 A2 | 4/2009 | |
| WO | 2011/109402 A2 | 9/2011 | |
| WO | 2012/054231 A2 | 4/2012 | |
| WO | 2014141115 A2 | 9/2014 | |
| WO | 2016033036 A2 | 3/2016 | |

OTHER PUBLICATIONS

Office Communication for U.S. Appl. No. 16/049,380 dated Sep. 27, 2018, pp. 1-40.
Office Communication for U.S. Appl. No. 16/140,485 dated Nov. 23, 2018, pp. 1-58.
International Search Report and Written Opinion in International Patent Application No. PCT/US18/32078 dated Nov. 16, 2018; pp. 1-16.
Savage, P., "GDC 2013: Valv's Michael Abrash on the challenges of VR—'A new world is emerging'," PCGamer; Apr. 2, 2013, pp. 1-6.
European Search Report for European Patent Application No. 08837063.0 dated Nov. 19, 2010, pp. 1-8.
Communication Pursuant to Article 94(3) EPC in European Patent Application No. 08837063.0 dated Dec. 27, 2011, pp. 1-5.
Communication Pursuant to Article 94(3) EPC in European Patent Application No. 08837063.0 dated Oct. 22, 2012, pp. 1-6.
International Search Report and Written Opinion in International Patent Application No. PCT/US2008/079663 dated Apr. 30, 2009, pp. 1-5.
International Search Report and Written Opinion in International Patent Application No. PCT/US2011/026691 dated Oct. 24, 2011, pp. 1-7.
International Search Report in International Patent Application No. PCT/US2011/054751 dated Jan. 30, 2012, pp. 1.
International Preliminary Report on Patentability in International Patent Application No. PCT/US2008/079663 dated Jan. 25, 2010, pp. 1-11.
International Preliminary Report on Patentability issued in PCT/US2011/026691 dated Sep. 4, 2012, pp. 1-7.
International Preliminary Report on Patentability issued in PCT/US2011/054751 dated Apr. 9, 2013, pp. 1-7.
Official Communication for U.S. Appl. No. 12/249,899 dated Sep. 14, 2011, pp. 1-11.
Official Communication for U.S. Appl. No. 12/249,899 dated Mar. 13, 2012, pp. 1-12.
Official Communication for U.S. Appl. No. 12/249,899 dated Jun. 6, 2012, pp. 1-12.
Official Communication for U.S. Appl. No. 13/037,949 dated Nov. 2, 2012, pp. 1-12.
Official Communication for U.S. Appl. No. 13/037,949 dated Aug. 26, 2013, pp. 1-9.
Official Communication for U.S. Appl. No. 13/605,948 dated Dec. 31, 2012, pp. 1-10.
Official Communication for U.S. Appl. No. 13/658,762 dated Sep. 13, 2013, pp. 1-16.
Official Communication for U.S. Appl. No. 13/877,652 dated Mar. 12, 2015, pp. 1-20.
Official Communication for U.S. Appl. No. 14/046,374 dated Feb. 20, 2014, pp. 1-10.
European Supplementary Search Report for European Patent Application No. 11634846.1 dated Feb. 21, 2014, pp. 1-7.
Official Communication for U.S. Appl. No. 13/858,762 dated Jan. 31, 2014, pp. 1-15.
Official Communication for U.S. Appl. No. 14/048,954 dated Feb. 26, 2014, pp. 1-24.
Official Communication for U.S. Appl. No. 14/048,954 dated Oct. 22, 2014, pp. 1-8.
International Search Report and Written Opinion for application PCT/US2015/023184 dated Jun. 29, 2015, pp. 1-13.
Official Communication for U.S. Appl. No. 13/877,652 dated Aug. 18, 2015, pp. 1-21.
Official Communication for U.S. Appl. No. 14/636,062 dated Sep. 25, 2015, pp. 1-8.
Official Communication for U.S. Appl. No. 14/671,904 dated Sep. 22, 2015, pp. 1-15.
Official Communication for U.S. Appl. No. 14/636,062 dated Jun. 2, 2015, pp. 1-7.
International Search Report and Written Opinion for PCT/US2015/044691 dated Nov. 18, 2015, pp. 1-12.
Official Communication for U.S. Appl. No. 14/823,668 dated Oct. 30, 2015, pp. 1-12.
Official Communication for U.S. Appl. No. 14/636,062 dated Dec. 14, 2015, pp. 1-3.
Official Communication for U.S. Appl. No. 14/823,668 dated Feb. 24, 2016, pp. 1-15.
Official Communication for U.S. Appl. No. 14/671,904 dated Feb. 22, 2016, pp. 1-13.
Official Communication for U.S. Appl. No. 13/877,652 dated Feb. 10, 2016, pp. 1-22.
Official Communication for U.S. Appl. No. 14/636,062 dated Feb. 1, 2016, pp. 1-9.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, pp. 1-10.
Official Communication for U.S. Appl. No. 14/218,643 dated Jun. 23, 2016, pp. 1-11.
Official Communication for U.S. Appl. No. 13/677,652 dated Aug. 12, 2016, pp. 1-22.
Official Communication for U.S. Appl. No. 15/194,502 dated Aug. 19, 2016, pp. 1-12.
Official Communication for U.S. Appl. No. 14/636,062 dated Aug. 24, 2016, pp. 1-9.
International Search Report and Written Opinion for Application PCT/US2016/027386 dated Aug. 26, 2016, pp. 1-10.
Official Communication for U.S. Appl. No. 14/671,904 dated Sep. 28, 2016, pp. 1-14.
Official Communication for U.S. Appl. No. 14/218,643 dated Nov. 1, 2016, pp. 1-10.
Kanzawa, Y., et al., "Human Skin Detection by Visible and Near-Infrared Imaging," IAPR Conference on Machine Vision Applications, Jun. 13-15, 2011, Nara Japan, pp. 1-5.
Office Communication for U.S. Appl. No. 13/877,652 dated May 31 2017, pp. 1-23.
Office Communication for U.S. Appl. No. 15/194,502 dated Mar. 9, 2017, pp. 1-7.
International Search Report and Written Opinion for International Application No. PCT/US2016/067626 dated Mar. 16, 2017, pp. 1-12.
Office Communication for U.S. Appl. No. 14/671,904 dated May 5, 2017, pp. 1-11.
Office Communication for U.S. Appl. No. 15/411,959 dated May 11, 2017, pp. 1-9.

(56) References Cited

OTHER PUBLICATIONS

International Search Report and Written Opinion for International Application No. PCT/US2017/014616 dated May 1, 2017, pp. 1-11.
Official Communication for U.S. Appl. No. 15/384,227 dated Feb. 7, 2017, pp. 1-8.
Official Communication for U.S. Appl. No. 15/384,227 dated Jul. 19, 2017, pp. 1-5.
Official Communication for U.S. Appl. No. 14/671,904 dated Aug. 18, 2017, pp. 1-7.
Official Communication for U.S. Appl. No. 15/194,502 dated Aug. 15, 2017, pp. 1-7.
Official Communication for U.S. Appl. No. 15/411,959 dated Aug. 29, 2017, pp. 1-5.
Official Communication for U.S. Appl. No. 13/877,652 dated Dec. 6, 2017, pp. 1-8.
Official Communication for U.S. Appl. No. 15/799,149 dated Jan. 10, 2018, pp. 1-7.
Official Communication for U.S. Appl. No. 15/444,182 dated Feb. 14, 2018, pp. 1-8.
Official Communication for U.S. Appl. No. 15/194,502 dated Feb. 12, 2018, pp. 1-9.
Official Communication for U.S. Appl. No. 15/804,392 dated Feb. 9, 2018, pp. 1-10.
Official Communication for U.S. Appl. No. 15/604,909 dated Feb. 12, 2018, pp. 1-14.
Official Communication for U.S. Appl. No. 15/098,285 dated Apr. 19, 2018, pp. 1-69.
International Search Report and Written Opinion for International Patent Application No. PCT/US2017/068377 dated Apr. 17, 2018, pp. 1-12.
Office Communication for U.S. Appl. No. 15/411,959 dated May 11, 2017, pp. 1-8.
Office Communication for U.S. Appl. No. 15/694,532 dated Jul. 10, 2016, pp. 1-45.
Office Communication for U.S. Appl. No. 15/804,392 dated Jun. 6, 2018, pp. 1-6.
Office Communication for U.S. Appl. No. 15/194,502 dated Jun. 11, 2018, pp. 1-13.
Office Communication for U.S. Appl. No. 15/804,909 dated Jul. 5, 2018, pp. 1-12.
Office Communication for U.S. Appl. No. 15/799,149 dated Jun. 20, 2018, pp. 1-7.
Office Communication for U.S. Appl. No. 15/853,783 dated Aug. 15, 2018, pp. 1-49. Li.
International Search Report and Written Opinion for International Patent Application No. PCT/US2017/059282 dated Aug. 10, 2018, pp. 1-10.
Office Communication for U.S. Appl. No. 15/444,182 dated Mar. 20, 2019, pp. 1-10.
Office Communication for U.S. Appl. No. 15/194,502 dated Mar. 6, 2019, pp. 1-11.
Office Communication for U.S. Appl. No. 16/223,043 dated Mar. 14, 2019, pp. 1-46.
Office Communication for U.S. Appl. No. 15/976,269 dated Mar. 25, 2019, pp. 1-49.
Office Communication for U.S. Appl. No. 15/194,502 dated Jan. 3, 2019, pp. 1-15.
Office Communication for U.S. Appl. No. 15/694,532 dated Jan. 17, 2019, pp. 1-9.
Office Communication for U.S. Appl. No. 15/853,783 dated Jan. 24, 2019, pp. 1-36.
Office Communication for U.S. Appl. No. 16/165,631 dated Apr. 1, 2019, pp. 1-23.
Office Communication for U.S. Appl. No. 15/976,269 dated Jul. 8, 2019, pp. 1-36.
Office Communication for U.S. Appl. No. 16/384,761 dated Jun. 21, 2019, pp. 1-93.
Office Communication for U.S. Appl. No. 16/261,528 dated May 17, 2019, pp. 1-82.
Office Communication for U.S. Appl. No. 16/165,631 dated Jul. 19, 2019, pp. 1-27.
International Search Report and Written Opinion for International Patent Application No. PCT/US2018/056757 dated Mar. 11, 2019, pp. 1-12.
European Supplementary Search Report for European Patent Application No. 16876940.4 dated May 8, 2019, pp. 1-8.
Office Communication for U.S. Appl. No. 16/398,139 dated Jun. 6, 2019, pp. 1-53.
Office Communication for U.S. Appl. No. 16/140,485 dated Jun. 3, 2019, pp. 1-34.

* cited by examiner

FAST SCANNING WITH DYNAMIC VOXEL PROBING

CROSS-REFERENCE TO RELATED APPLICATIONS

This Utility Patent Application is a Continuation of U.S. patent application Ser. No. 15/799,149 filed on Oct. 31, 2017, now U.S. Pat. No. 10,067,230 issued on Sep. 4, 2018, which is based on a previously filed U.S. Provisional Patent Application U.S. Ser. No. 62/496,888 filed on Oct. 31, 2016, the benefit of the filing dates of which are claimed under 35 U.S.C. § 120 and § 119(e), and the contents of which are each further incorporated in entirety by reference.

TECHNICAL FIELD

The present invention relates generally to a LIDAR system and to methods of making and using the LIDAR system. The present invention is also directed a multi-pass LIDAR system with synchronized time-selective triggered dynamic voxel probing with multiple-pass granular resolution refinement, detail image contrast enhancement, ambient light suppression, and hyper spectral color options and methods of making and using the LIDAR system.

BACKGROUND

Range determination systems may be employed to determine a range, a distance, a position and/or a trajectory of a remote object, such as an aircraft, a missile, a drone, a projectile, a baseball, a vehicle, or the like. The systems may track the remote object based on detection of photons, or other signals, emitted and/or reflected by the remote object. The range determination systems may illuminate the remote object with electromagnetic waves, or light beams, emitted by the systems. The systems may detect a portion of light beams that are reflected, or scattered, by the remote object. The systems may suffer from one or more of undesirable speed, undesirable accuracy, or undesirable susceptibility to noise.

DETAILED DESCRIPTION OF THE INVENTION

Figure 1:
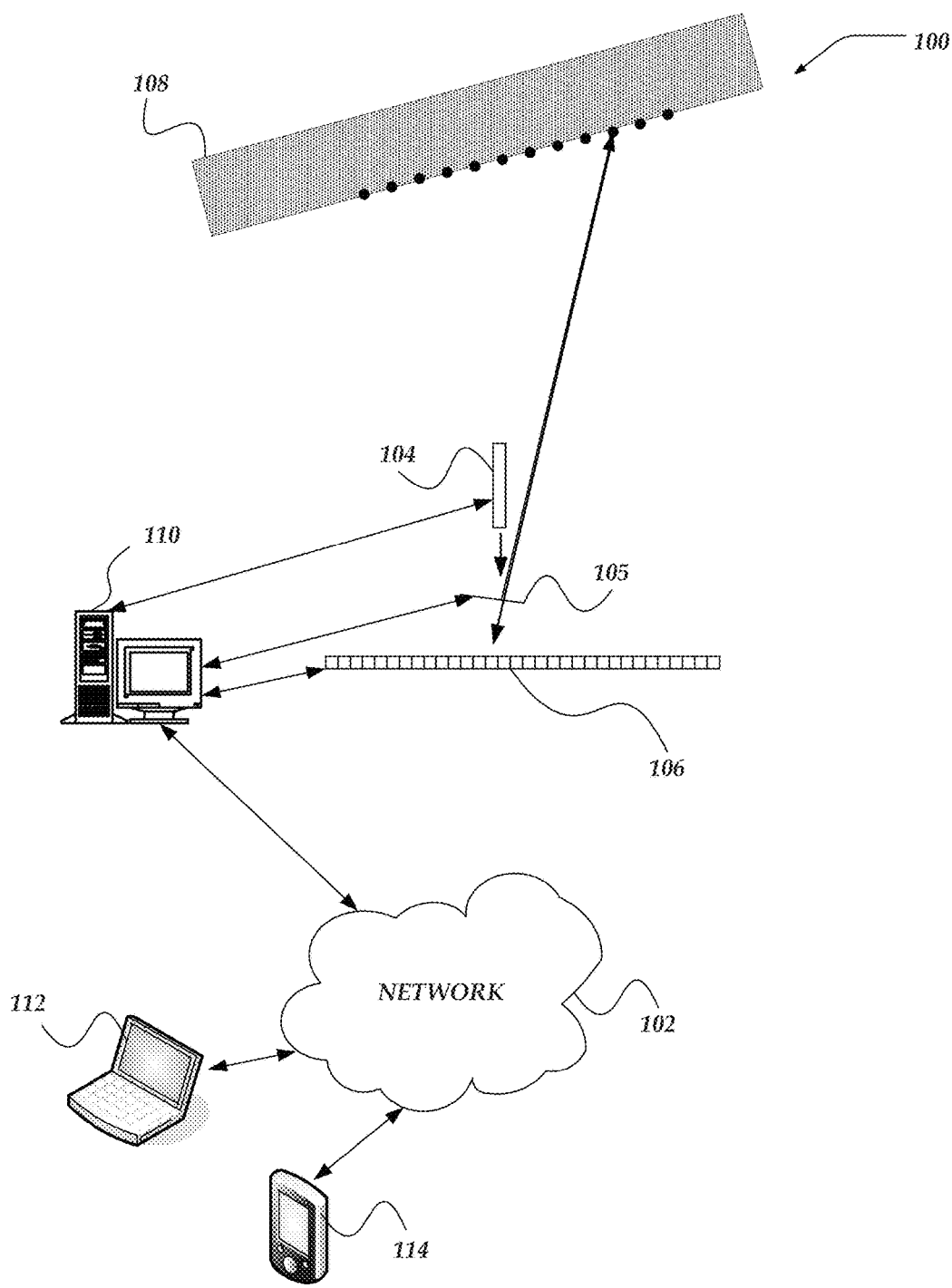
FIG. 1 shows an embodiment of an exemplary environment in which various embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum. An outgoing light beam is a beam that is transmitted by various ones of the various embodiments disclosed herein. An incoming light beam is a beam that is detected by various ones of the various embodiments disclosed herein.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), an organic light emitting diode (OLED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "receiver," "photon receiver," "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of one or more photons. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), complementary metal-oxide-semiconductor (CMOS) devices, silicon photomultipliers (SiPM), photovoltaic cells, phototransistors, twitchy pixels, or the like. A photon detector may detect one or more incoming light beams.

As used herein, the term "target" is one or more various 2D or 3D bodies that reflect or scatter at least a portion of incident light, EM waves, or photons. The target may also be referred to as an "object." For instance, a target or object may scatter or reflect an outgoing light beam that is transmitted by various ones of the various embodiments disclosed herein. In the various embodiments described herein, one or more light sources may be in relative motion to one or more of receivers and/or one or more targets or objects. Similarly, one or more receivers may be in relative motion to one or more of light sources and/or one or more targets or objects. One or more targets or objects may be in relative motion to one or more of light sources and/or one or more receivers.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to measuring a distance or range to a target or other object that reflects light using light emitted from a light source and a receiver that receives the reflections. The system can utilize a fast scanner to scan a field of view of can use a slower scanner which performs a first scan of a continuous beam from the light source over the field of view to obtain a coarse range and follows with a second scan over the field of view using short pulses from the light source to refine the range. Additional scans can be performed to further refine the range or to determine color of the target or other object. A second, slower scanner may be added to rotate about a different axis form the first scanner to scan a two-dimensional region.

Illustrated Operating Environment

FIG. 1 shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention. As shown, system 100 of FIG. 1 includes network 102, light source 104, scanner 105, receiver 106, one or more objects or targets 108, and a system computer device 110. In some embodiments, system 100 may include one or more other computers, such as but not limited to laptop computer 112 and/or mobile computer, such as but not limited to a smartphone or tablet 114. In some embodiments, light source 104 and/or receiver 106 may include one or more components included in a computer, such as but not limited to various ones of computers 110, 112, or 114. The light source 104, scanner 105, and receiver 106 can be coupled directly to the computer 110, 112, or 114 by any wireless or wired technique or may be coupled to the computer 110, 112, o4 114 through a network 102.

System 100, as well as other systems discussed herein, may be a sequential-pixel photon projection system. In one or more embodiment system 100 is a sequential-pixel laser projection system that includes visible and/or non-visible photon sources. Various embodiments of such systems are described in detail in at least U.S. Pat. Nos. 8,282,222, 8,430,512, 8,696,141, 8,711,370, U.S. Patent Publication No. 2013/0300,637, and U.S. Patent Publication No. 2016/0041266. Note that each of the U.S. patents and U.S. patent publications listed above are herein incorporated by reference in the entirety.

Object 108 may be a three-dimensional object. Object 108 is not an idealized black body, i.e. it reflects or scatters at least a portion of incident photons. Light source 104 may include one or more light sources for transmitting light or photon beams. Examples of suitable light sources includes lasers, laser diodes, light emitting diodes, organic light emitting diodes, or the like. For instance, light source 104 may include one or more visible and/or non-visible laser sources. In at least some embodiments, light source 104 includes one or more of a red (R), a green (G), or a blue (B) laser source. In at least some embodiment, light source includes one or more non-visible laser sources, such as a near-infrared (NIR) or infrared (IR) laser. A light source may provide continuous or pulsed light beams of a predetermined frequency, or range of frequencies. The provided light beams may be coherent light beams. Light source 104 may include various ones of the features, components, or functionality of a computer device, including but not limited to mobile computer 200 of FIG. 2 and/or network computer 300 of FIG. 3.

Light source 104 may also include an optical system that includes optical components to direct or focus the transmitted or outgoing light beams. The optical systems may aim and shape the spatial and temporal beam profiles of outgoing light beams. The optical system may collimate, fan-out, or otherwise manipulate the outgoing light beams. At least a portion of the outgoing light beams are aimed at the scanner 105 which aims the light beam at the object 108.

Scanner 105 receives light from a light source and then rotates or otherwise moves to scan the light over a field of view. The scanner 105 may be any suitable scanning device including, but not limited to, a MEMS scan mirror, acousto-optical, electro-optical scanners, or fast phased arrays, such as 1D ribbon MEMS arrays or Optical Phased Arrays (OPA). Scanner 105 may also include an optical system that includes optical components to direct or focus the incoming or outgoing light beams. The optical systems may aim and shape the spatial and temporal beam profiles of incoming or outgoing light beams. The optical system may collimate, fan-out, or otherwise manipulate the incoming or outgoing light beams. Scanner 105 may include various ones of the features, components, or functionality of a computer device, including but not limited to mobile computer 200 of FIG. 2 and/or network computer 300 of FIG. 3.

Receiver 106 is described in more detail below. Briefly, however, receiver 106 may include one or more photon-sensitive, or photon-detecting, arrays of sensor pixels. An array of sensor pixels detects continuous or pulsed light beams reflected from target 108. The array of pixels may be a one dimensional-array or a two-dimensional array. The pixels may include SPAD pixels or other photo-sensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by light source 104 and relatively insensitive to other frequencies. Receiver 106 also includes an optical system that includes optical components to direct and focus the received beams, across the array of pixels. Receiver 106 may include various ones of the features, components, or functionality of a computer device, including but not limited to mobile computer 200 of FIG. 2 and/or network computer 300 of FIG. 3.

Various embodiment of computer device 110 are described in more detail below in conjunction with FIGS. 2-3 (e.g., computer device 110 may be an embodiment of mobile computer 200 of FIG. 2 and/or network computer 300 of FIG. 3). Briefly, however, computer device 110 includes virtually various computer devices enabled to perform the various range or distance determination processes and/or methods discussed herein, based on the detection of photons reflected from one or more surfaces, including but not limited to surfaces of object or target 108. Based on the detected photons or light beams, computer device 110 may alter or otherwise modify one or more configurations of light source 104 and receiver 106. It should be understood that the functionality of computer device 110 may be performed by light source 104, scanner 105, receiver 106, or a combination thereof, without communicating to a separate device.

In some embodiments, at least some of the range or distance determination functionality may be performed by other computers, including but not limited to laptop computer 112 and/or a mobile computer, such as but not limited to a smartphone or tablet 114. Various embodiments of such computers are described in more detail below in conjunction with mobile computer 200 of FIG. 2 and/or network computer 300 of FIG. 3.

Network 102 may be configured to couple network computers with other computing devices, including light source 104, photon receiver 106, tracking computer device 110, laptop computer 112, or smartphone/tablet 114. Network 102 may include various wired and/or wireless technologies for communicating with a remote device, such as, but not limited to, USB cable, Bluetooth®, Wi-Fi®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In one or more of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between light source 104, photon receiver 106, and tracking computer device 110, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Mobile Computer

Figure 2:
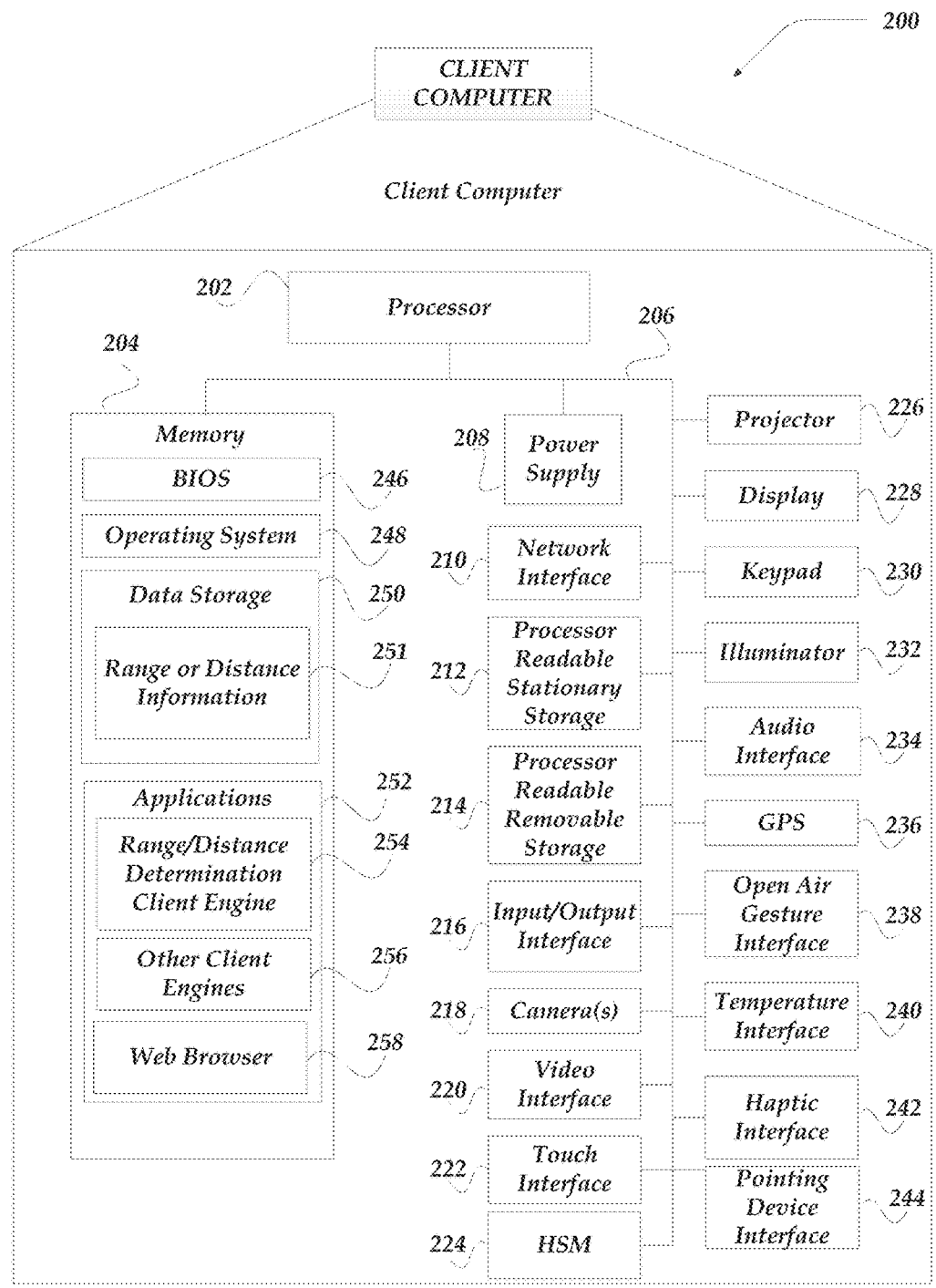
FIG. 2 illustrates an embodiment of an exemplary mobile computer that may be included in a system such as that shown in FIG. 1.

FIG. 2 shows one embodiment of an exemplary mobile computer 200 that may include many more or less components than those exemplary components shown. Mobile computer 200 may represent, for example, one or more embodiment of laptop computer 112, smartphone/tablet 114, and/or computer 110 of system 100 of FIG. 1. Thus, mobile computer 200 may include a mobile device (e.g., a smart phone or tablet), a stationary/desktop computer, or the like.

Client computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Client computer 200 may optionally communicate with a base station (not shown), or directly with another computer.

And in one embodiment, although not shown, a gyroscope may be employed within client computer 200 for measuring and/or maintaining an orientation of client computer 200.

Power supply 208 may provide power to client computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling client computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (NIC).

Audio interface 234 may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to a digital video camera, a web-camera, or the like. Video interface 220 may comprise a lens, an image sensor, and other electronics. Image sensors may include a complementary metal-oxide-semiconductor (CMOS) integrated circuit, charge-coupled device (CCD), or various other integrated circuits for sensing light.

Keypad 230 may comprise various input devices arranged to receive input from a user. For example, keypad 230 may include a push button numeric dial, or a keyboard. Keypad 230 may also include command buttons that are associated with selecting and sending images.

Illuminator 232 may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, client computer 200 may also comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be a stand-alone computer, in other cases, HSM 224 may be arranged as a hardware card that may be added to a client computer.

Client computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 242 may be arranged to provide tactile feedback to a user of the client computer. For example, the haptic interface 242 may be employed to vibrate client computer 200 in a particular way if another user of a computer is calling. Temperature interface 240 may be used to provide a temperature measurement input and/or a temperature changing output to a user of client computer 200. Open air gesture interface 238 may sense physical gestures of a user of client computer 200, for example, by using single or stereo video cameras, radar, a gyroscopic sensor inside a computer held or worn by the user, or the like. Camera 218 may be used to track physical eye movements of a user of client computer 200.

GPS transceiver 236 can determine the physical coordinates of client computer 200 on the surface of the Earth, which typically outputs a location as latitude and longitude values. GPS transceiver 236 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 236 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 228 or keypad 230 can instead be routed through network interface 210 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 250, which can be utilized by client computer 200 to store, among other things, applications 252 and/or other data. For example, data storage 250 may also be employed to store information that describes various capabilities of client computer 200. In one or more of the various embodiments, data storage 250 may store range or distance information 251. The information 251 may then be provided to another device or computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another component of client computer 200, including, but not limited to, non-transitory processor-readable stationary storage device 212, processor-readable removable storage device 214, or even external to the client computer.

Applications 252 may include computer executable instructions which, if executed by client computer 200, transmit, receive, and/or otherwise process instructions and data. Applications 252 may include, for example, range/distance determination client engine 254, other client engines 256, web browser 258, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

The web browser engine 226 may be configured to receive and to send web pages, web-based messages, graphics, text, multimedia, and the like. The client computer's browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
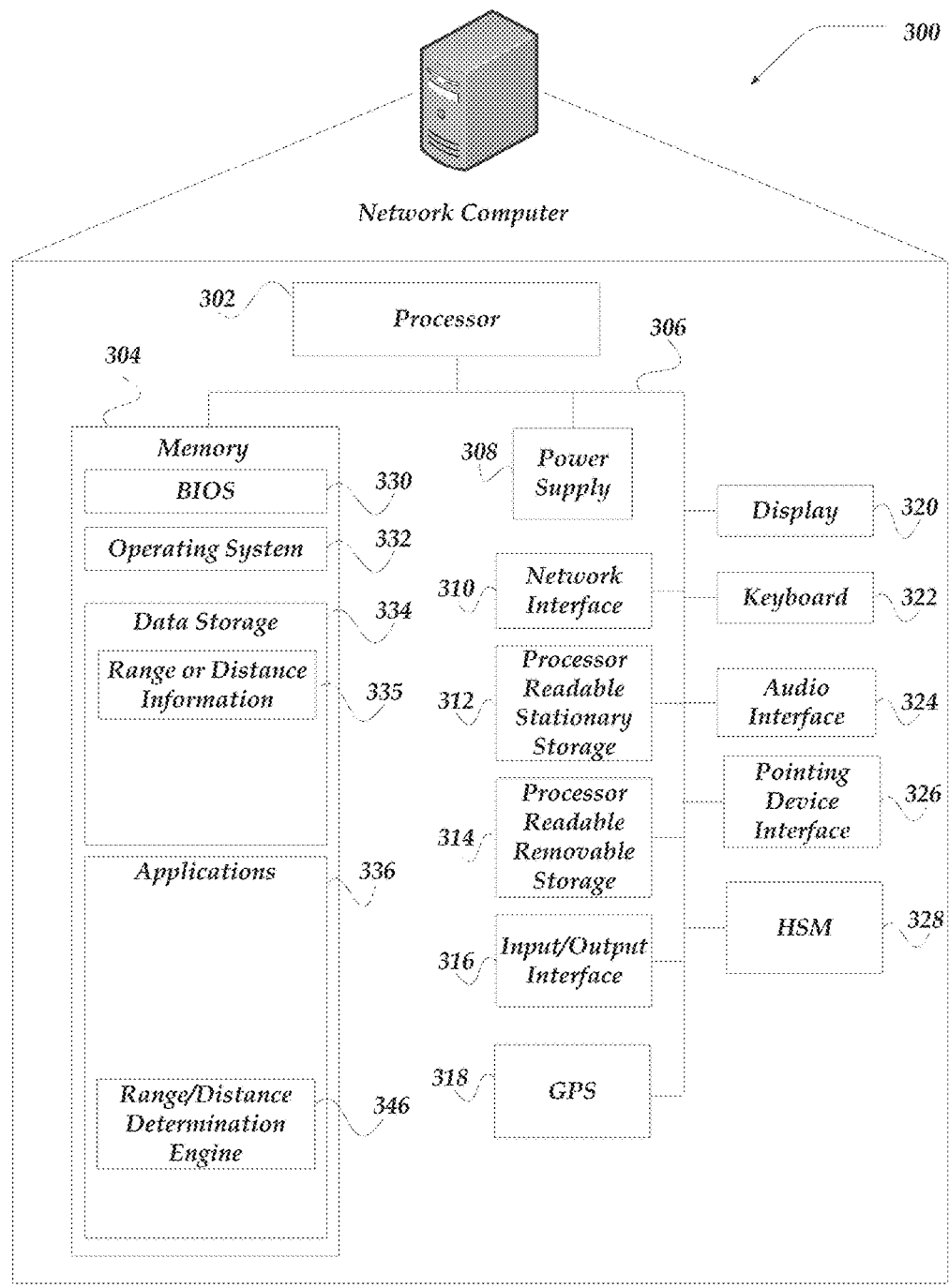
FIG. 3 shows an embodiment of an exemplary network computer that may be included in a system such as that shown in FIG. 1.

FIG. 3 shows one embodiment of an exemplary network computer 300 that may be included in an exemplary system implementing one or more of the various embodiments. Network computer 300 may include many more or less components than those shown in FIG. 3. However, the components shown are sufficient to disclose an illustrative embodiment for practicing these innovations. Network computer 300 may include a desktop computer, a laptop computer, a server computer, a client computer, and the like. Network computer 300 may represent, for example, one embodiment of one or more of laptop computer 112, smartphone/tablet 114, and/or computer 110 of system 100 of FIG. 1.

As shown in FIG. 3, network computer 300 includes a processor 302 that may be in communication with a memory 304 via a bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store range or distance information 335. The range or distance information 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include range or distance determination engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, range or distance determination engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to range or distance determination engine 346 may be provisioned and de-commissioned automatically.

Also, in one or more of the various embodiments, range or distance determination engine 346 or the like may be located in virtual servers running in a cloud-based computing environment rather than being tied to one or more specific physical network computers.

Further, network computer 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrated Systems

Figure 4:
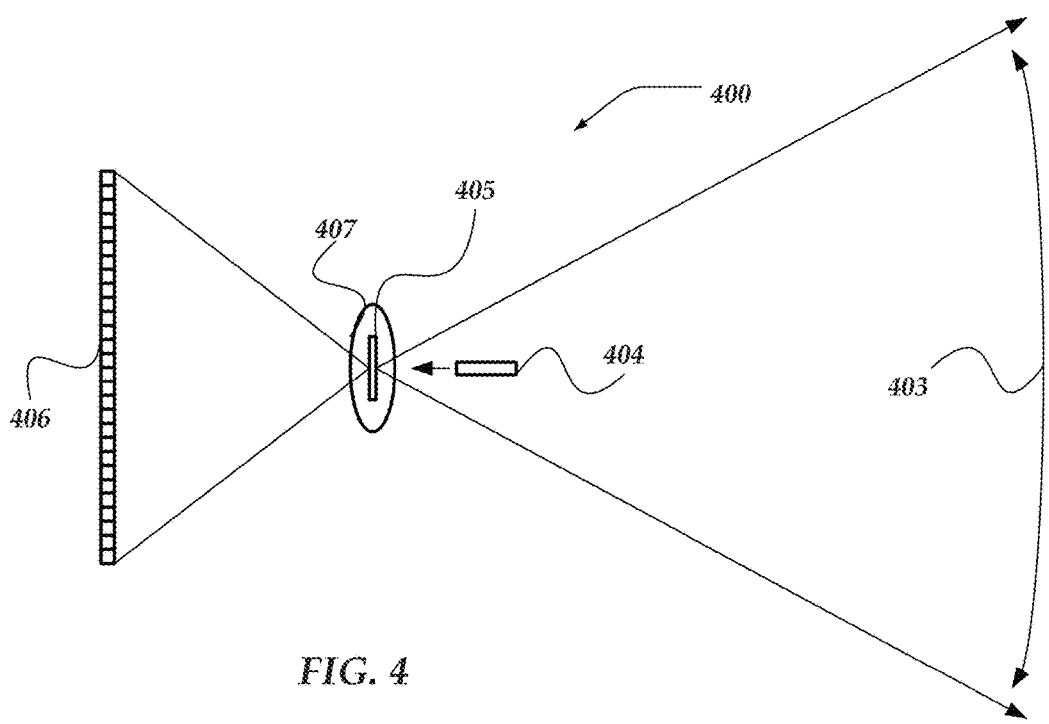
FIG. 4 illustrates an embodiment of a two-dimensional view of an exemplary LIDAR system.

FIG. 4 illustrates one embodiment of a LIDAR system 400. In at least some embodiments, the LIDAR system 400 is a fast scanning system moving a scan beam from a light source 404 continuously (for example, smoothly, rapidly, and without stopping) across many positions of one or more objects 108 (see, FIG. 1) by directing the light from the light source to a scanner 405 which then sequentially scans a field of view 403. Light reflected by the one or more objects in the field of view (FoV) 403 passes through an aperture 407 and is received and detected by the receiver 406. In some embodiments, the scanner 405 utilizes the ultrafast resonant rotation of a MEMS scan mirror (or other suitable scanning mirror or device) which quickly moves over a range of angles to scan the field of view 403. As described in more detail below, other, slower scanners 405 can also be used in techniques employing two or more scan passes.

When using a fast scanner 405, the light beam direction from the scanner changes so fast that each fraction of angular direction can be paired temporally with an ultra-short time interval of just nanoseconds in duration. This establishes an angular position-as-a-function-of-time (time=>angle), a function that can later be inverted, creating the inverse 1-1 function (angle=>time), for example, in a look up table, to yield accurate bounds to the range of possible departure times for the reflected photons for each incoming direction of observed reflections by the pixels of the receiver 406. In at least some embodiments, the coarse departure time can be derived from the angular direction at which the reflected light is observed which may be determined by the position of the pixel of the receiver 406 that detects the light.

In at least some embodiments of this LIDAR system 400, the receiver 406 is co-located with, or located near, the scanner 405 and detects photons reflected from the one or more objects in the field of view as the photons return to the receiver 406. These photons return at the same angle—but now travelling in the opposite "return to sender" direction. In at least some embodiments, the receiver 406 is a one-dimensional or two-dimensional receiver.

Any suitable photon receiver 406 can be used including any suitable pixelated photon receiver 406. Examples of pixelated photon receivers include, but are not limited to, pixels arranged as a Spatio-temporal Sorting Array (SSA), for example, an array of fast asynchronous SPAD (single-photon avalanche diode) pixels, that record both the direction and the time of arrival. Examples of SSA arrays can be found in U.S. Pat. Nos. 8,282,222; 8,430,512; and 8,696,141, all of which are incorporated herein by reference in their entirety. A Spatio-temporal Sorting Array can be analogized to a camera having a detector array positioned in the focal plane of an imaging system that spatially quantizes incoming ray directions, matching small bundles of incoming directions with individual pixels. The SSA may in fact be a camera with a 2D array of pixels or alternatively any of the asynchronous sensing arrays as described in U.S. Pat. Nos. 8,282,222; 8,430,512; 8,696,141; 8,711,370; 9,377,553; 9,753,126 and U.S. Patent Application Publications Nos. 2013/0300637 and 2016/0041266, all of which are incorporated herein by reference in their entirety. Other suitable arrays for use as the receiver 406 include, but are not limited to, 1D and 2D imaging arrays using CMOS (complementary metal-oxide semiconductor), CCD (charge-coupled device), APD (avalanche photodiodes), SPADE, SiPM (silicon photomultipliers), or the like or any combination thereof as pixels.

In at least some embodiments, for a single pass scan technique, the scanning speed of the scanner 405 and the spatial resolution of the array of the receiver 406 of LIDAR system 400 are preferably relatively high. For example, in a fast scanning system a full scan across the FoV (Field of View) may take only 1 microsecond or less. When reflections of the scan beam return into the aperture, incoming directions are sorted into, for example, 100, 500, 1000, 2000, 5000, or 10,000 or more bins. Using as an example, an array with 1000 SPAD pixels in a row aligned with the scan direction, by the recorded scanner positions (beam directions) over a 1 microsecond scan, the departure time ($T_d$) of each reflection can be resolved to 1 nanosecond (one microsecond/1000 bins). The arrival time ($T_a$) is resolved in time also to an instant of a nanosecond (or less for a SPAD array). Using the departure and arrival times, the round-trip time of flight (ToF) of the arriving photons can be determined. The distance to the object from which the detected photons were reflected is the ToF divided by 2 times the photon speed (i.e., the speed of light, c). This example of a system can achieve a ranging resolution of ½ foot (approximately 0.35 meters) or less.

The resolution of this LIDAR system 400 may depend on having sufficient pixels as the more spatial time sorting bins (i.e., pixels) in the array, the better. For example, 10,000 tiny 1 micrometer CMOS "twitchy pixels" could provide high resolution, provided that the instantaneous reflected photon intensity is high enough to trigger the tiny pixels within a nanosecond. U.S. Pat. No. 9,753,125, incorporated herein by reference in the entirety, describes "twitchy pixels" as sensor array pixels that provide a nearly instantaneous signal output once a photo current exceeds a minimal level. For example, in at least some embodiments, a "twitchy pixel" can be a photodiode connected to a source follower or other circuit that instantly amplifies the photodiode's current. The amplified signal is in turn connected to a sensing line. The sensing line may be a shared function between a whole column or row of such "twitchy pixels." The basic 'twitch' function of the pixel is binary; its primary function is to report when and/or where signal photons have arrived in the receiver. In the LIDAR system 400, "twitchy pixels" and SPADs can be employed interchangeably in the receiver 406.

In at least some embodiments of a single-pass technique, the LIDAR system 400 uses a very fast scanner that can scan the full width (or height) of the FoV within a few microseconds, for example, 5, 3, 2, or 1 microseconds or less. Very fast scanners 405 can include, but is not limited to, acousto-optical, electro-optical scanners, or fast phased arrays, such as 1D ribbon MEMS arrays or Optical Phased Arrays (OPA). Such scanners may have limited deflection angles and may use additional optical stages to amplify the scan angle to overcome the limited deflection angles. Moreover, in at least some embodiments, these scanners may only operate with monochrome beams in a very limited part of the spectrum. As a result, such ultrafast scanners may be expensive, fragile or cumbersome, and may be challenging to use, particularly for compact, mobile applications.

In some embodiments of the LIDAR system 400, a slower scanner 405, such as a resonant MEMS scan mirror, can be used. In some embodiments, this scanner may scan no faster than 100, 75, 60, or 50 kHz or less. A scan technique utilizing two or more scan passes can be used to produce a robust and accurate LIDAR system.

Figures 5, 7:
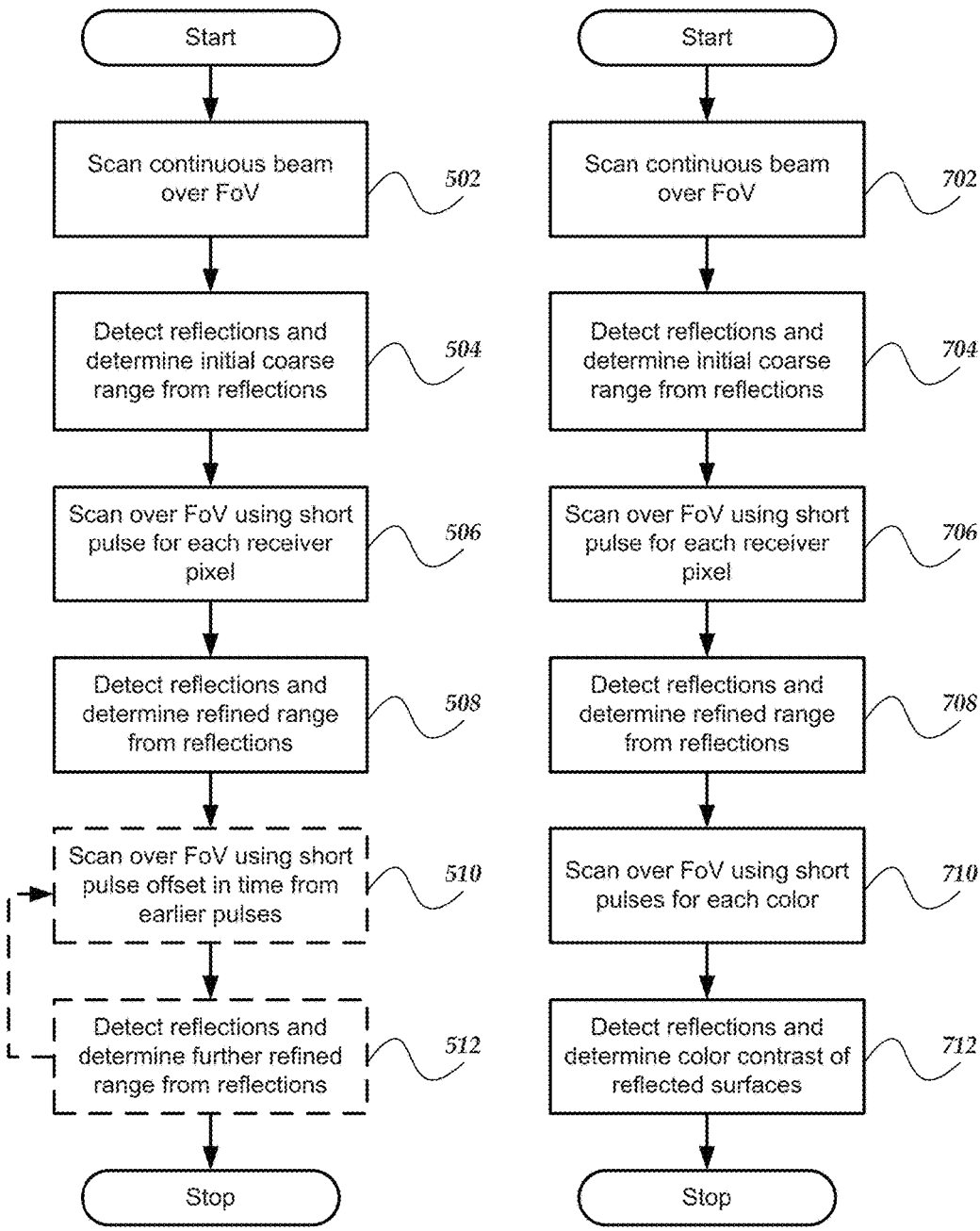
FIG. 5 illustrates an embodiment of a logical flow diagram for an exemplary method of range or distance determination using a multi-scan process.
FIG. 7 shows an embodiment of a logical flow diagram for an exemplary method of range or distance determination using a multi-scan process with color or color contrast determination.

FIG. 5 illustrates steps in a two-scan technique. In step 502, a continuous beam from the light source 404 is scanned over the field of view (FoV) 403 using the scanner 405. For example, the continuous beam can scan across the FoV over, for example, 5, 10, or 20 microseconds or more, although slower or faster scan times may be used.

Figure 6A:
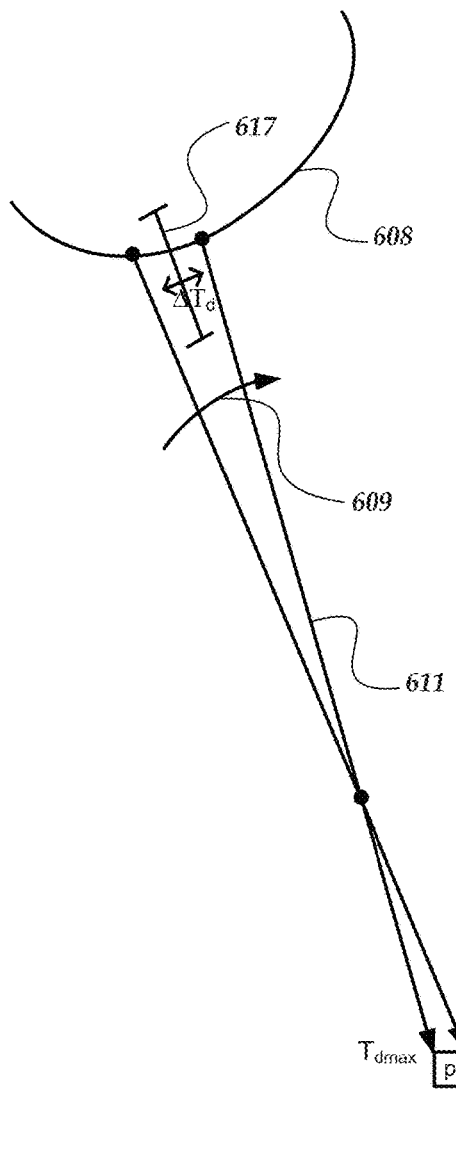
FIG. 6A illustrates an embodiment of a two-dimensional view of an exemplary scan using a continuous light beam for coarse range or distance determination.

In step 504, photons reflected from one or more objects in the FoV are detected by the receiver 406 and the detected photons can be used, as described above to provide an initial coarse range to the one or more objects. FIG. 6A illustrates one embodiment of this first scan where the scanner 405 (FIG. 4) is scanning in a direction 609. Light 611 is reflected from an object 608 and then received at the ith pixel $p_i$ 606i of a receiver 406 (FIG. 4) containing n pixels. The departure time ($T_d$) for a photon detected by pixel $p_i$ can be coarsely resolved with a resolution 617 that is a function of $\Delta T_d$ which is the difference between the maximum departure time ($T_{dmax}$) and minimum departure time ($T_{dmin}$) for photons that would be detected by the pixel $p_i$. As an example, a 1000 pixel 1D receiver can be used to detect photons from a 10 microsecond scan (for example, using a 50 kHz bidirectional 1D resonant MEMS scanning mirror as the scanner) which gives a $\Delta T_d$ of 10 ns per pixel. Using simple ToF ranging calculations, with a temporal resolution of the arrival time ($T_a$) of 1 ns, the initial coarse range resolution 617 can be resolved to, for example, 5 feet (about 1.5 meters) for each reflection observed by the receiver. Thus, the estimated range to an object can be coarsely resolved and, in some embodiments, the system may note those pixels that detect photons and those that do not.

Figure 6B:
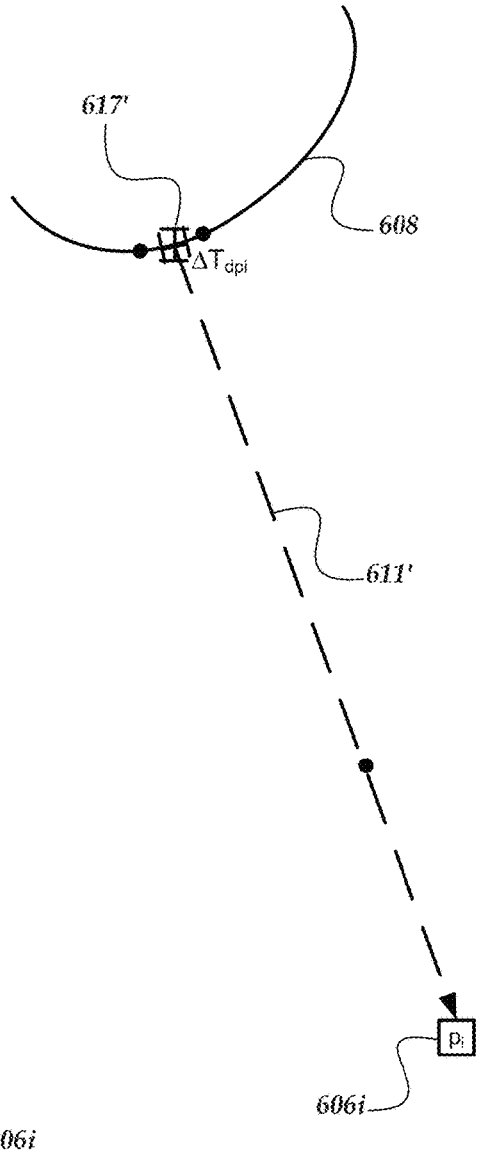
FIG. 6B illustrates an embodiment of a two-dimensional view of an exemplary scan using a pulsed light beam for refined range or distance determination.

In step 506, the same FoV is scanned, but instead of using a continuous beam, short pulses 611' (for example, sharp "pinprick" pulses) are emitted by the light source 404, as illustrated in FIG. 6B. In some embodiments, this second scan pass (or "refinement" scan) can be performed by retracing the same scan in the opposite direction on the return stroke of the scanner. In other embodiments, the scanner returns to its initial position and then scans in the same direction. The short pulses have a pulse width $\Delta T_{dpi}$ that is shorter than $\Delta T_d$ of the first scan and each pulse is synchronized to correspond to one of the pixels. Preferably, the pulse width $\Delta T_{dpi}$ is no more than 30%, 25%, 10%, 5% or less of the $\Delta T_d$ of the first scan. In at least some embodiments, the pulse width of the light pulses is less than a scan time for the second scan pass divided by the number of pixels in a single row of the receiver. In at least some embodiments, the pulse width is no more than 1 nanosecond or 500 or 100 picoseconds or less.

Optionally, pulses may only be emitted when reflections from corresponding object locations were observed in the previous coarse scan. Individual pixels in the array may be actively enabled. The initial continuous coarse line scan may inform the system which specific pixels to selectively activate, and when exactly to activate each pixel during the second "refinement" scan. Only a fraction of pixels may be activated in cases where only a small subset of the FoV has reflecting objects within the LIDAR range of interest.

In step 508, the reflected pulses are received by the photon receiver 406 and the arrival time $T_a$ of the reflected pulse is determined. For a known arrive time from the pixel, the distance or range to the one or more objects 408 can be determined, just as for the initial coarse range resolution in step 504, but with higher accuracy. The departure times of each of the short pulses from the light source are also known, so the reflected light pulses can be associated with discrete departure times ($T_d$). Those departure times can be known to high precision, for example, for 100 ps pulses the departure time is known to 100 ps precision. The reflected pulses are confined to a known interval (for example, 100 picoseconds (ps)) and are matched uniquely to a single pixel in the array. Continuing the example presented above, the short pulses can be 100 ps pulses with each pulse synchronized in time for reception of the reflection by individual pixel locations of the receiver 406 (for example, the center of each of the 1000 pixel locations.) When a SPAD array docks the incoming arrival time ($T_a$) and matches that to the corresponding departure time ($T_d$) with a resolution of, for example 100 ps, then the distance observation can be improved by $1/100$. For example, for the initial coarse range resolution of 5 feet in the example provided above, the refined range resolution can be 0.05 foot or approx. 1.5 cm.

In some embodiments, the initial coarse range determined from the first scan informs the control system when to activate individual pixels, enabling the system to narrowly confine the pixel timing to only be active for just a few nanoseconds. Therefore, by using this anticipatory activation method, not only may the beam pulses be timed to directionally match the receiver's exact pixel location, but also each individual pixel may be activated only for the anticipated arrival time $T_a$, for example, for only 10 nanoseconds (where 10 nanoseconds is the time uncertainty—the ToF range uncertainty—determined for reflections in that pixel's staring direction during the previous coarse scan.)

In some embodiments using the anticipatory activation technique, the system is capable of reducing the interference of ambient or stray light. For example, using the anticipatory activation technique on the second scan with a 10 ns window for each pixel, ambient light would have at most 10 nanoseconds to interfere with reflected light received by the pixel, as compared to 10 milliseconds for a full FoV scan. Thus, only a 1 millionth fraction of sunlight, at most $1/10^{th}$ lux even in an intensely blinding environment (one millionth fraction of 100K lux=full direct sunlight) would be received by the pixel.

In some embodiments, SPAD pixels may be activated in Geiger mode (characterized by highly volatile high voltage, the reverse bias across the photo diode) and thus be extra sensitive, yielding strong, instantaneous, low jitter pulses.

It should be noted that during the second "refinement" scan the scan pulses can be very sparse, limited to getting a better fine-grained look at just a few selected detected objects, e.g. a small object in the planned flight path of a quad copter. With the nanosecond anticipatory activation of SPADS, ambient light may be suppressed to such a degree that little energy per pulse is required, and the total energy emitted can be kept well under safe levels.

In optional steps 510 and 512, the process of steps 506 and 508 is repeated one or more times (i.e., steps 510 and 512 can be repeated multiple times) except that the short pulses in successive scans are shifted small increments in time (for example, a fraction of a nanosecond). This has the effect of accessing locations directly adjacent to those identified on the surface of an object in steps 506 and 508. On a contiguous surface, the reflections of these later short pulses should arrive predictably within 100 ps of the reflections obtained from short pulses of previous scans. Surface models (for example, of cars, drones, vehicles, or the like) may help clarify the image computationally, given that picosecond accurate surface observations may become part of the object's voxel motion data set provided to a downstream vision processing system.

Optionally, the system may also enable a range-select feature by turning on the individual pixels for times shorter than $\Delta T_d$ or only activating selective pixels for which the coarse range determination of the first scan pass indicates that an object is likely present within the selected range. For example, in at least some embodiments, a 50 ft. range selection reduces the SPAD activation to a short 100 nanosecond period only, enabling, for example, brief SPAD pixel on-times in Geiger mode, which may increase the system's sensitivity In at least some embodiments, the system may be filterless, as narrow band-pass filters may no longer be required. In at least some embodiments, multi-spectral illuminations may be enabled on during the second scan pass or later scan passes.

FIG. 7 illustrates a method for color LIDAR. Steps 702-708 in FIG. 7 are the same as steps 502-508 in FIG. 5.

In step 710, one or more scan passes, similar to that performed in steps 508 and 708 using short pulses of light, are performed for the visible light primaries—red, green, blue—(or other colors) using light of the particular light primary from a light source or using a white light source. In some embodiments, a single scan pass can be performed using three (or more) light beams of different colors or using a single white light source. In other embodiments, successive scan passes can be made using a light beam of a single, different color during each scan. In at least some embodiments, these one or more scan passes retrace the same or similar trajectories across the surface of the object as the second scan pass in step 708.

Figure 8:
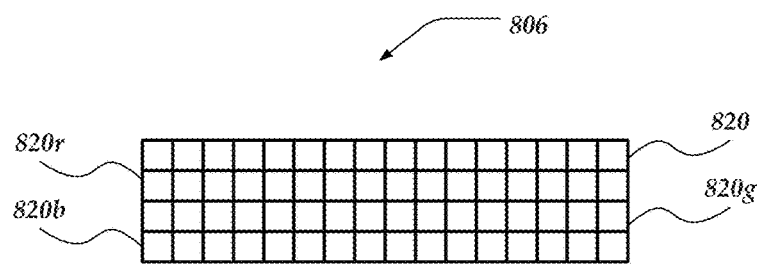
FIG. 8 illustrates an embodiment a two-dimensional view of an exemplary receiver configuration with rows of pixels for color or color contrast determination.

In step 712, the reflected photons of specific colors are detected by color-sensitive pixels of the receiver and used to determine the color or color contrast of the surface of the object. FIG. 8 illustrates one embodiment of a receiver 806 that includes a row of pixels for detecting light from the first and second scan passes and rows of pixels 820r, 820g, 820b for detecting red, green, and blue light, respectively. The color-sensitive pixels may be specifically designed to be activated by the associated color or may incorporate color filters to remove light of other colors or any other arrangement for making the pixels color-sensitive. Because each color pulse is deterministically matched to a specific sensor pixel, and because there are still as many as 1000 or more pixels in the array, the pulse rate and range of the system can be 1000 (or more) times greater than traditionally pulsed LIDAR systems using a single APD detector.

This method results in a three (or more) pass system hyper-resolved color LIDAR 1) An initial coarse pass, with a continuously turned on beam, which discovers the reflections of surfaces and establishes the approximate range and position of each surface point (i.e. coarse voxels). 2) A second refinement pass with picosecond precise light pulses to achieves centimeter accurate range resolution. 3) A final pass (or set of passes) with active nanosecond precise pixel specific active range gating eliminates practically all remaining ambient light and enables precise color reflection measurements using, for example, selected spectral primary light sources.

Figure 9:
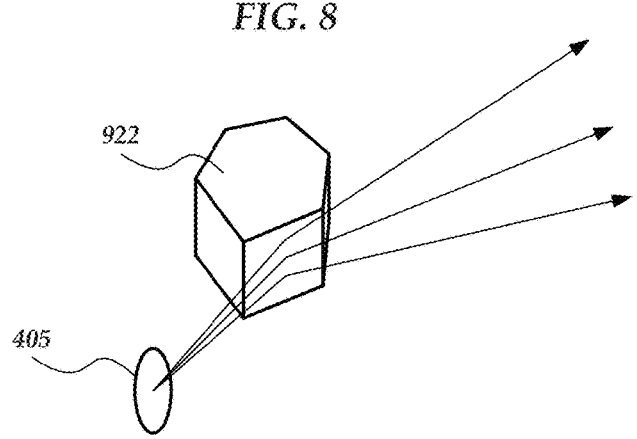
FIG. 9 illustrates an embodiment a three-dimensional perspective view of an exemplary scanner configuration with a fast scanner and a slow scanner.

A two-dimensional (2D) scanning LIDAR system can also be made using a fast scanner 405 and a slow scanner 922, as illustrated in FIG. 9. As an example, a MEMS scan mirror or any other suitable fast 1D scanner can be used as the scanner 405. In at least some embodiments, the scanner 405 will scan at a rate of 25 or 50 kHz or more. The slow scanner 922 provides a second scan dimension by creating a bi-directional scan path. For example, a hexagonal scanner 922 (or octagonal scanner or any other suitable scanner) can be rotated slowly about the axis perpendicular to the scanner surface to slowly scan along a second dimension as the fast scanner 405 repeatedly scans along the first dimension. The slow polygonal surface equally deflects both outgoing rays or pulses and incoming reflections over, for example, a 90 degree (or larger or smaller) FoV during its rotation. Another example of a slow scanner 922 is a slow two-dimensional quasi-static MEMS mirror which can be operated at 1 to 4 kHz.

The reflected photons can be directed only a one-dimensional (or two-dimensional) receiver 406 just as with the single scanner embodiments described above. For example, the incoming photons can be detected by an array of 1000 pixels (coarse time is 10 to 20 nanoseconds) with a coarse range resolution of 5-10 feet.

The fast scan period of the fast scanner 405 is several orders of magnitude (no more than a few microseconds) shorter than the required slow scan period of the slow scanner 922 (a few milliseconds or more). For example, in one embodiment, each of the fast scans takes no more than 10 microseconds and the slow scanner 922 moves only a tiny distance during that time. For example, an octagonal scanner that rotates 10 Hz, resulting in 80 full frames of detection per second with a field of view of up to 90 degrees, has a slow axis rotation speed of about 7200 degrees/second. So, in 10 microseconds the scan line shifts by only 0.072 degrees.

Figure 11:
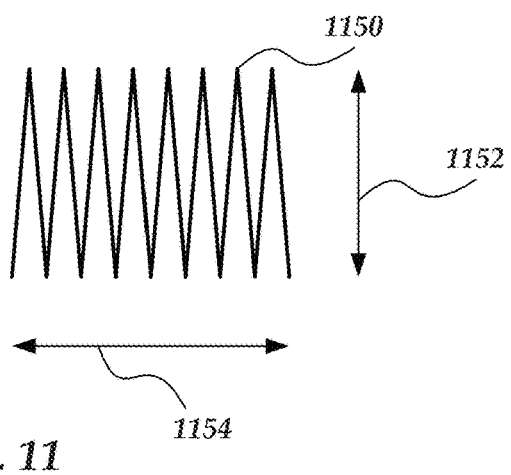
FIG. 11 illustrates an embodiment a two-dimensional view of a graph illustrated a two-dimensional foveation scan pattern.

Another example of a slow scanner 922 is a slow two-dimensional mirror such as the two axis MEMs mirrors which can be operated at 1 to 4 kHz. The relatively slow scanning speed of the slow scanner 922 can be used to generate two-dimensional scanning pattern 1150 analogous an eye's foveation motion, as illustrated in FIG. 11. Movement along the scanning direction 1152 of the fast scanner 405 is faster than movement along the scanning direction 1154 of the slow scanner 922. In at least some embodiments, the system may use the foveation motion to lock onto an object of interest (for example, a child crossing the street or a nearby vehicle) after detection and/or classification of the object.

Figure 10A:
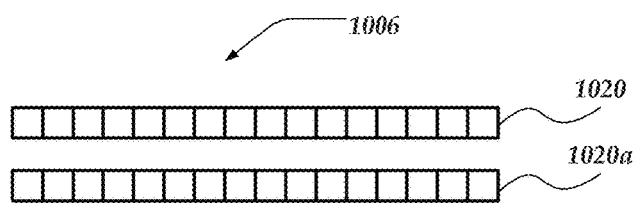
FIG. 10A illustrates another embodiment a two-dimensional view of an exemplary receiver configuration with spaced-apart rows of pixels.
Figure 10B:
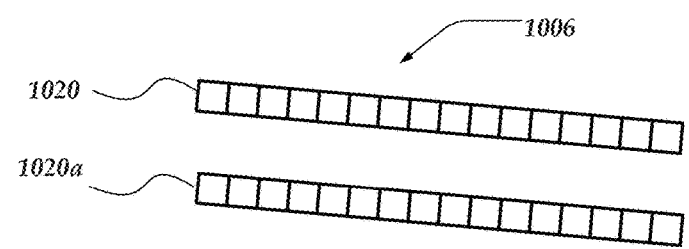
FIG. 10B illustrates another embodiment a two-dimensional view of an exemplary receiver configuration with tilted, spaced-apart rows of pixels.

Although the one-dimensional receiver 406 can be used with the two scanner system, in some embodiments, a receiver 1006 having two or more rows of pixels 1020, 1020a, as illustrated in FIGS. 10A and 10B, can be used to account for the slow rotation of the slow scanner 922. In the illustrated embodiment of FIG. 10A, two or more rows of pixels 1020, 1020a can be provided so that photons reflected during the first scan are detected by the first row 1020 and photons reflected during the second scan are detected by the second row 1020a. The separation distance between the first and second rows can reflect the amount of rotation of the slow scanner 922 between the first and second scans. Moreover, in some embodiments, the first scan proceeds in one direction along the first row of pixels 1020 and then the second scan proceeds in the opposite direction along the second row of pixels 1020a as the scanner 405 returns to its original position. In other embodiments, the first scan proceeds in one direction along the first row of pixels 1020 then the scanner returns to its original position and then the second scan proceeds in the same direction along the second row of pixels 1020a. In this latter case, the separation between rows may be greater due to the additional time for the scanner to return to its original position.

In the illustrated embodiment of FIG. 10B, two or more rows of pixels 1020, 1020a are angled (exaggerated in FIG. 10B) to account for the slight rotation of the slow scanner 922 during the first scan or the second scan, respectively. In the illustrated embodiment of FIG. 10B, the first scan proceeds in one direction along the first row of pixels 1020 then the scanner returns to its original position and then the second scan proceeds in the same direction along the second row of pixels 1020a. Alternatively, the first scan can proceed in one direction along the first row of pixels 1020 and then the second scan proceed in the opposite direction along the second row of pixels 1020a as the scanner 405 returns to its original position; in which case, the second row of pixels 1020a would be tilted in the opposite direction of the first row of pixels 1020.

Figure 12:
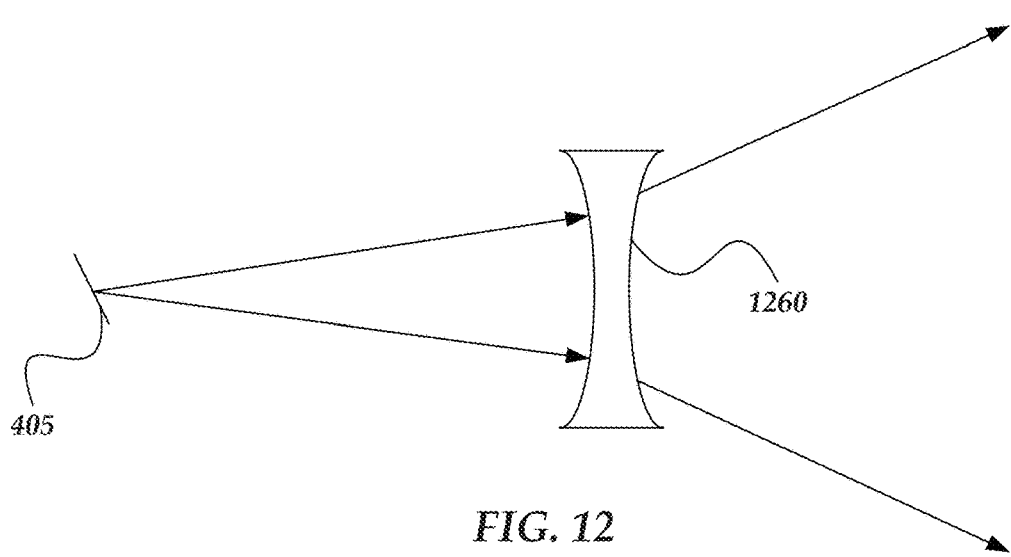
FIG. 12 illustrates an embodiment a two-dimensional view of an exemplary scanner with optics for widening the field of view.
Figure 13:
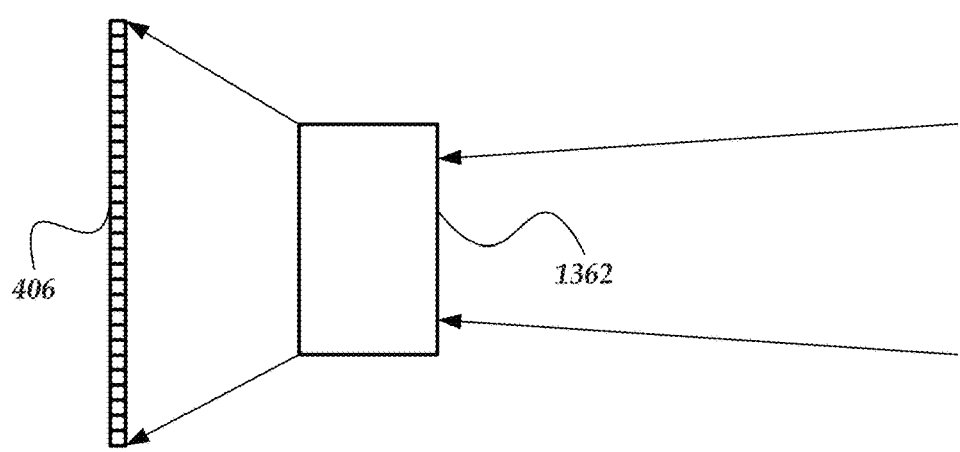
FIG. 13 illustrates an embodiment a two-dimensional view of an exemplary receiver with optics for widening the received light to provide more pixels for the receiver.

In some embodiments, optics can be used to enhance the system. For example, in FIG. 12 a lens 1260 can be positioned to receive the light from the scanner 405 to spread the light over a wider field of view than is accessible from the scanner. In FIG. 13, telescopic optics 1362 can be used to widen the range of the reflected photons so that a larger array of pixels (for example, more pixels) can be provided in the receiver.

Figure 14:
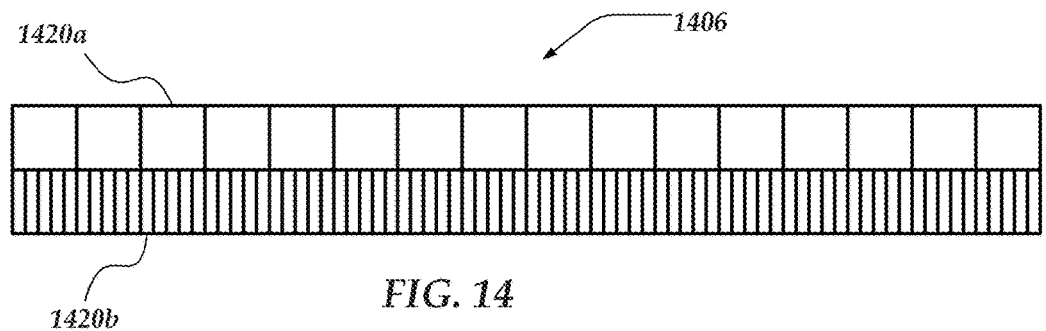
FIG. 14 illustrates another embodiment a two-dimensional view of an exemplary receiver configuration with rows of pixels having different pixel density.

FIG. 14 illustrates another embodiment of a receiver 1406 that can be used, for example, to provide a system that may reduce potential damage to viewers. In this system, the first scan is performed using a near infrared or infrared light source (for example, a 1550 nm NIR laser) that will generally not damage the retina of a viewer. The first set of pixels 1420a of receiver 1406 are designed to detect the corresponding photons. The second scan can be performed using a visible laser (such as a blue diode laser), but this scan only emits short pulses of light. The second set of pixels 1420b of receiver 1460 are designed to detect these photons. Alternatively, the second scan be made using the near infrared or infrared light source followed by a third scan with the visible laser. The energy of an infrared or near infrared light source can be much higher and continuous or strongly pulsed with very long range, reaching intensive bursts.

In at least some embodiments, when the system discovers an object in the range of view using the first scan (and, optionally, the second scan), the system may decide to refine the range using pulses from a visible laser. These pulses may utilize the anticipatory activation technique described above in which the pulses are only emitted when the first scan indicated that an object was within the range of interest. Thus, the pulses of visible light may be very sparse, but they will be easy to resolve with an array of tiny pixels. These pixels 1420b may even be smaller than those of the first set of pixels 1420a, as illustrated in FIG. 14. As an example, a receiver may have a 10 ram line with a row of 1000 10 micrometer SPADS designed to detect 1500 nm photons and a second row with, for example, 10,000 1 micrometer blue-sensitive pixels (or, alternatively, a second optical receiver co-located with a multi primary scanner and the less resolved 1550 nm sensitive array, e.g. InGaAs). These two separate receivers or two rows of pixels would be positioned with their optical centers aligned with the axis of the scanner.

Figure 15:
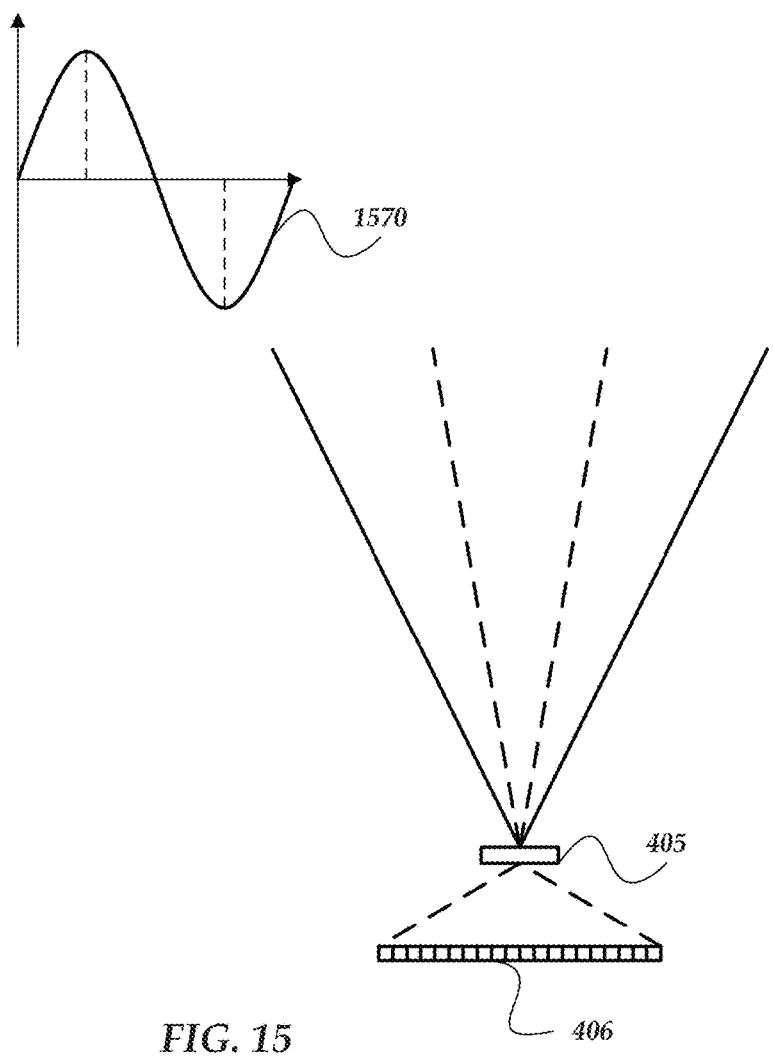
FIG. 15 illustrates an embodiment a two-dimensional view of an exemplary scanner with operation over a limited field of view.

In at least some embodiments, the scanner 405 can be operated across a reduced field of view to provide faster scan and more pixels per degree of the field of view. This may result in higher relative angular resolution and more accurate time resolution. Such an arrangement is illustrated in FIG. 15, where graph 1570 corresponds to the angular deflection of the scanner 405 over time. The solid lines extending from the scanner 405 indicate the full field of view. However, if the field of view is limited to the dotted lines in FIG. 15, the scanner 405 operates in the region between the dotted lines on graph 1570. The receiver 406 is configured to receive only light from the reduced field of view.

Using the techniques described above, including the anticipatory activation method, the system can reliably detect objects even in fog or drizzle. A probabilistic prediction model, such as a Bayesian model, looking at photons arriving at pixels over very brief time intervals is provided. First to arrive are those photons that have taken the shortest path and that return exactly from the direction they were sent to in a pixel sequential scanning. Taking this into account, a gated pixel, such as those gated using the anticipatory activation method described above, then expects light to arrive at a short predictable interval. Using this anticipatory activation method not only filters ambient light, it also discriminates against light coming from other directions, for example, any light that ended up travelling via indirect (i.e., longer) paths such as those scattered or deflected by fog or raindrops.

In a conventional camera, even with strong headlights (particularly with strong headlights) pixels in the array see all the light ending up in their individual "bundle bins" of ray directions ($\frac{1}{60}^{th}$ of a degree by $\frac{1}{60}^{th}$ of a degree for a system matching the resolution of human vision ("AKA 20/20 Vision). Coarser systems, such as traditional LIDAR APDs and SPADS, typically resolve only one square degree, which is a 3600 times coarser ray bundle than a CMOS camera pixel in a Cellphone can see. Therefore, in these legacy coarse scanning LIDAR systems more (a higher fraction of) stray and partially scattered light ends up in each bin.

When light rays emitted by headlights are scattered by the fog or drizzle, they deviate from the straight path they are supposed to travel. This has two effects: 1) Any scattered path they follow is by definition a longer path, longer than the straight ray path from the source of light to an object's surface, and the straight return path back from that surface back to the detector. 2) When light wanders off the straight path, there is a high likelihood it will end up illuminating the surface at a different place, and even without further scattering will end up in another pixel in the SSA. And if the reflected light is further scattered on the way back the likelihood that it will be ending up in the detector's aperture and anywhere in the vicinity of the direct in line pixel is even more remote.

Figure 16A:
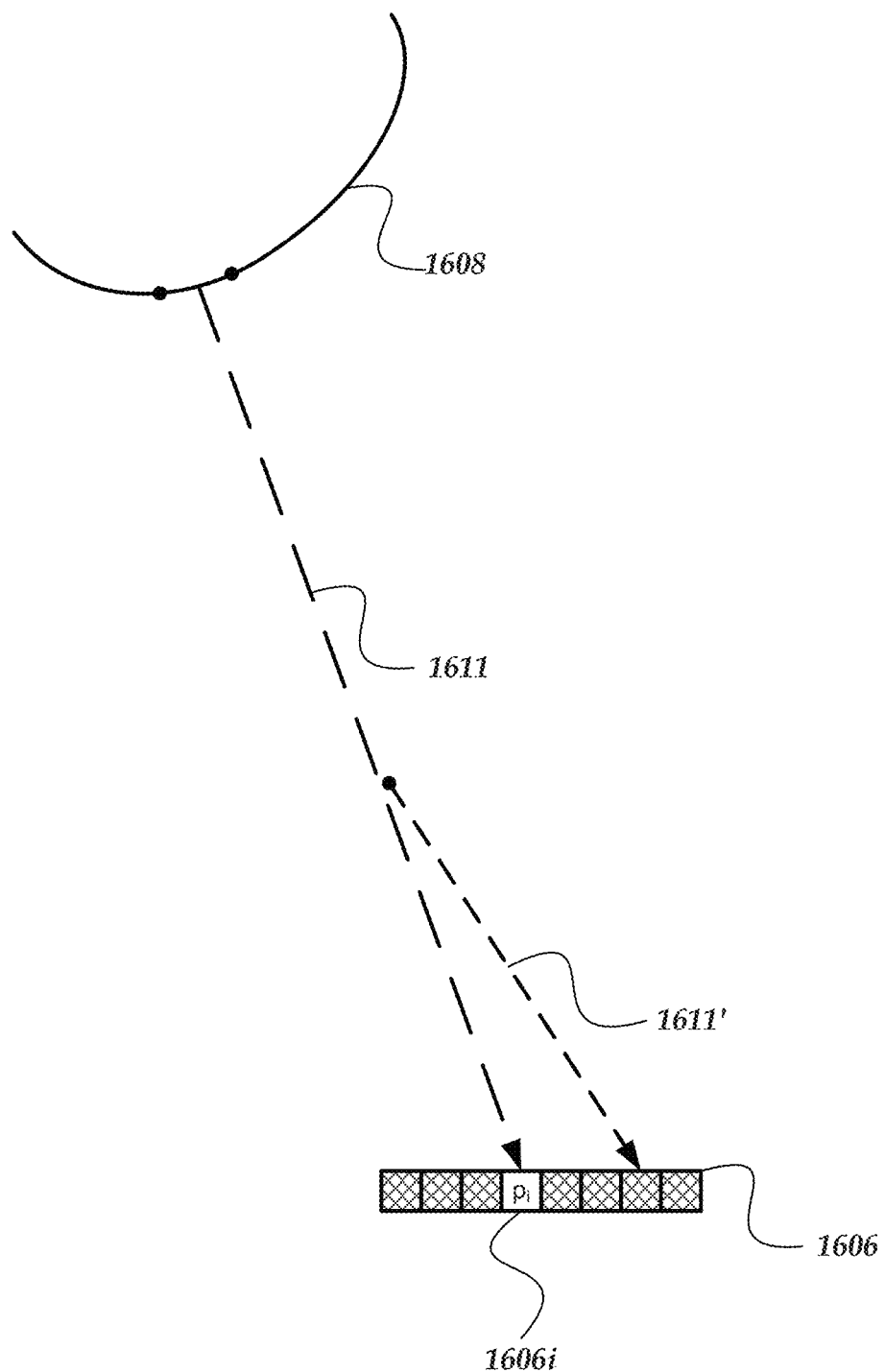
FIG. 16A illustrates an embodiment of a two-dimensional view of a portion of an exemplary LIDAR system and illustrating the effect of fog or drizzle on the light and receiver.
Figure 16B:
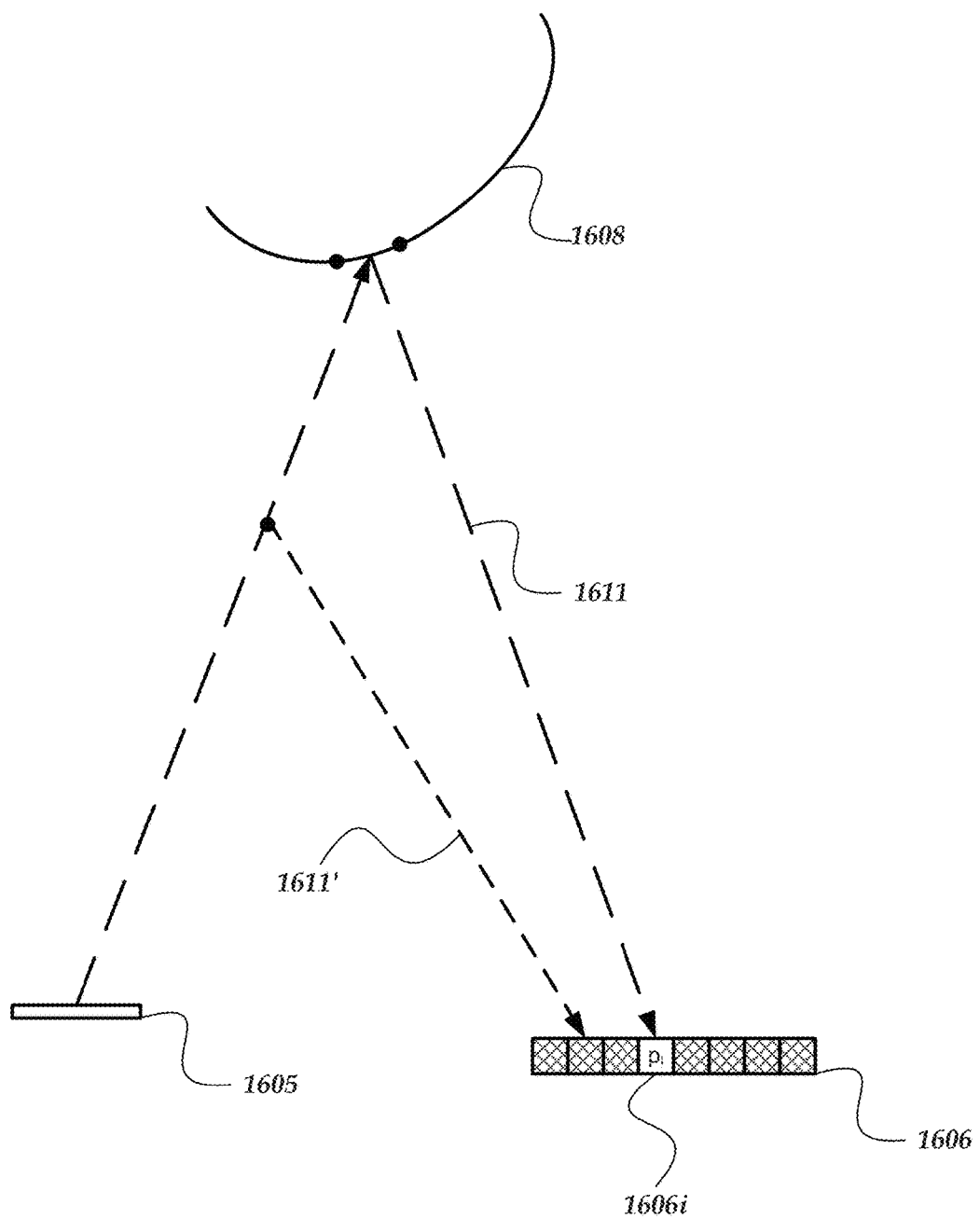
FIG. 16B illustrates another embodiment of a two-dimensional view of a portion of an exemplary LIDAR system and illustrating the effect of fog or drizzle on the light and receiver.

It follows therefore that in the described system, using the pulsed emissions in combination with the anticipated activation of pixels to gate the activation of pixels, reception by the pixels will be highly selective and filter out the great majority of all scattered light. Each pixel sees only the light that travelled the shortest path, and precisely when it is expected to arrive. The signal is reduced (or filtered) to only the photons captured by the selectively activated pixels in the receiver, each pixel activated at a particular nanosecond). The system can select down to (or tune in to) the directly emitted and directly reflected rays only, the first photons to arrive that actually touched the surface of an object in the fog, are those having travelled the shortest path there (the object's surface) and back again. This is illustrated in FIG. 16A where unscattered light 1611 reflected from object 1608 is received and detected by activated pixel 1606i, but scattered light 1611' is directed to the other inactive pixels of the receiver and, therefore, is not detected. Similarly, as depicted in FIG. 16B, in a triangulated LIDAR system (where the light from the scanner 1605 reflects from the object 1608 at an angle toward the receiver 1606), light 1611' scattered by fog or drizzle will typically not be detected by the activated pixel 1606i.

Conversely, any light reflected back or scattered in the direct path that arrives (ahead of time, or too late) from that direction may be filtered out by the system. The shorter the activation period (for example, from 1 to 10 nanoseconds for the coarse scan or, for example, 100 to 500 picoseconds for the refinement scan) the more selective, favoring non-scattered photons.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for measuring a range of one or more objects, the method comprising:
    employing a scanner to scan a continuous light beam at the one or more objects;
    employing continuous light reflected by the one or more objects to determine a coarse range between the scanner and the one or more objects;
    employing the scanner to scan a pulsed light beam at the one or more objects;
    employing pulses of light reflected by the one or more objects to determine a refined range between the scanner and the one or more objects;
    employing a lens that is configured to widen the reflected continuous light and the reflected pulses of light that are incident on a plurality of pixels of a receiver, wherein the reflected light incident on the pixels is employed to determine the determined range and the refined range; and
    iteratively redetermining the refined range based on subsequent reflected pulses of light over time generated by other scans of the pulsed of light beam at the one or more objects.

2. The method of claim 1, further comprising another scanner that scans a light beam at the one or more objects, wherein the other scanner performs one or more actions including:
    employing the light beam to scan the one or more objects at a slower rate than the scanner scans the light beam at the one or more objects, wherein the combination of the scanning of the light beam by the other scanner and the scanner provides the scanning of the continuous light beam or the pulsed light beam at the one or more objects.

3. The method of claim 1, further comprising another scanner that scans a light beam at the one or more objects, wherein the other scanner employs another axis that is oriented different than an axis of the scanner to scan the light beam at the one or more objects, wherein the combination of the scanning of the light beam by the other scanner and the scanner provides the scanning of the continuous light beam or the pulsed light beam at the one or more objects.

4. The method of claim 1, further comprising employing a lens that is configured to increase a field of view that the scanner scans the continuous light beam and the pulsed light beam at the one or more objects.

5. The method of claim 1, further comprising employing a receiver that includes a plurality of pixels for detecting the reflected continuous light and the reflected pulses of light from the one or more objects, wherein one of the continuous light beam or the pulsed light beam is a non-visible light beam and the other is a visible light beam.

6. The method of claim 1, further comprising employing a receiver that includes a plurality of pixels for detecting the reflected continuous light and the reflected pulses of light from the one or more objects, wherein a portion of the pixels are relatively physically smaller than a another portion of the pixels, and wherein the smaller portion of pixels are configured to detect non-visible reflected light and the other portion of the pixels are configured to detect visible reflected light.

7. The method of claim 1, further comprising employing activation of one or more of a plurality of pixels configured to detect the reflected continuous light and the reflected pulse of light to filter out at least a portion of scattered light that is detected by the plurality of pixels.

8. The method of claim 1, further comprising employing activation of one or more of a plurality of pixels configured to detect one or more of the continuous light or the reflected pulse of light to detect and compensate for an environmental condition disposed between the scanner and the one or more objects.

9. The method of claim 1, providing a different color for one or more of the continuous light beam or the pulsed light beam based on a color of a preceding scan of one or more of the continuous light beam or the pulsed light beam.

10. A system to measure a range of one or more objects, comprising:
    a scanner configured to scan light over a field of view;
    a receiver that comprises a plurality of pixels configured to detect light;
    one or more memory devices that store instructions; and
    one or more processor devices that execute the stored instructions to perform actions, including:
        employing the scanner to scan a continuous light beam at the one or more objects;
        employing continuous light reflected by the one or more objects onto the pixels of the receiver to determine a coarse range between the scanner and the one or more objects;
        employing the scanner to scan a pulsed light beam at the one or more objects;

employing pulses of light reflected by the one or more objects onto the pixels of the receiver to determine a refined range between the scanner and the one or more objects;
employing a lens that is configured to widen the reflected continuous light and the reflected pulses of light that are incident on a plurality of pixels of a receiver, wherein the reflected light incident on the pixels is employed to determine the determined range and the refined range; and
iteratively redetermining the refined range based on subsequent reflected pulses of light over time generated by other scans of the pulsed of light beam at the one or more objects.

11. The system of claim 10, further comprising another scanner that scans a light beam at the one or more objects, wherein the other scanner performs one or more actions including:
employing the light beam to scan the one or more objects at a slower rate than the scanner scans the light beam at the one or more objects, wherein the combination of the scanning of the light beam by the other scanner and the scanner provides the scanning of the continuous light beam or the pulsed light beam at the one or more objects.

12. The system of claim 10, further comprising another scanner that scans a light beam at the one or more objects, wherein the other scanner employs another axis that is oriented different than an axis of the scanner to scan the light beam at the one or more objects, wherein the combination of the scanning of the light beam by the other scanner and the scanner provides the scanning of the continuous light beam or the pulsed light beam at the one or more objects.

13. The system of claim 10, further comprising employing a lens that is configured to increase a field of view that the scanner scans the continuous light beam and the pulsed light beam at the one or more objects.

14. The system of claim 10, further comprising employing a receiver that includes a plurality of pixels for detecting the reflected continuous light and the reflected pulses of light from the one or more objects, wherein one of the continuous light beam or the pulsed light beam is a non-visible light beam and the other is a visible light beam.

15. The system of claim 10, further comprising employing a receiver that includes a plurality of pixels for detecting the reflected continuous light and the reflected pulses of light from the one or more objects, wherein a portion of the pixels are relatively physically smaller than a another portion of the pixels, and wherein the smaller portion of pixels are configured to detect non-visible reflected light and the other portion of the pixels are configured to detect visible reflected light.

16. The system of claim 10, further comprising employing activation of one or more of a plurality of pixels configured to detect the reflected continuous light and the reflected pulse of light to filter out at least a portion of scattered light that is detected by the plurality of pixels.

17. The system of claim 10, further comprising employing activation of one or more of a plurality of pixels configured to detect one or more of the continuous light or the reflected pulse of light to detect and compensate for an environmental condition disposed between the scanner and the one or more objects.

18. The system of claim 10, providing a different color for one or more of the continuous light beam or the pulsed light beam based on a color of a preceding scan of one or more of the continuous light beam or the pulsed light beam.

19. A non-transitory processor readable storage media that includes instructions for measuring a range to one or more objects, wherein execution of the instructions by one or more processor devices cause the one or more processor devices to perform actions, comprising:
employing a scanner to scan a continuous light beam at the one or more objects;
employing continuous light reflected by the one or more objects to determine a coarse range between the scanner and the one or more objects;
employing the scanner to scan a pulsed light beam at the one or more objects;
employing pulses of light reflected by the one or more objects to determine a refined range between the scanner and the one or more objects;
employing a lens that is configured to widen the reflected continuous light and the reflected pulses of light that are incident on a plurality of pixels of a receiver, wherein the reflected light incident on the pixels is employed to determine the determined range and the refined range; and
iteratively redetermining the refined range based on subsequent reflected pulses of light over time generated by other scans of the pulsed of light beam at the one or more objects.

20. The media of claim 19, further comprising another scanner that scans a light beam at the one or more objects, wherein the other scanner performs one or more actions including:
employing the light beam to scan the one or more objects at a slower rate than the scanner scans the light beam at the one or more objects, wherein the combination of the scanning of the light beam by the other scanner and the scanner provides the scanning of the continuous light beam or the pulsed light beam at the one or more objects.

21. The media of claim 19, further comprising another scanner that scans a light beam at the one or more objects, wherein the other scanner employs another axis that is oriented different than an axis of the scanner to scan the light beam at the one or more objects, wherein the combination of the scanning of the light beam by the other scanner and the scanner provides the scanning of the continuous light beam or the pulsed light beam at the one or more objects.

22. The media of claim 19, further comprising employing a lens that is configured to increase a field of view that the scanner scans the continuous light beam and the pulsed light beam at the one or more objects.

23. The media of claim 19, further comprising employing a receiver that includes a plurality of pixels for detecting the reflected continuous light and the reflected pulses of light from the one or more objects, wherein one of the continuous light beam or the pulsed light beam is a non-visible light beam and the other is a visible light beam.

24. The media of claim 19, further comprising employing a receiver that includes a plurality of pixels for detecting the reflected continuous light and the reflected pulses of light from the one or more objects, wherein a portion of the pixels are relatively physically smaller than a another portion of the pixels, and wherein the smaller portion of pixels are configured to detect non-visible reflected light and the other portion of the pixels are configured to detect visible reflected light.

25. The media of claim 19, further comprising employing activation of one or more of a plurality of pixels configured to detect the reflected continuous light and the reflected pulse of light to filter out at least a portion of scattered light that is detected by the plurality of pixels.

26. The media of claim 19, further comprising employing activation of one or more of a plurality of pixels configured to detect one or more of the continuous light or the reflected pulse of light to detect and compensate for an environmental condition disposed between the scanner and the one or more objects.

27. The media of claim 19, providing a different color for one or more of the continuous light beam or the pulsed light beam based on a color of a preceding scan of one or more of the continuous light beam or the pulsed light beam.

\* \* \* \* \*